United States Patent
Adachi et al.

(10) Patent No.: US 10,499,222 B2
(45) Date of Patent: Dec. 3, 2019

(54) RADIO TERMINAL AND CONTROL METHOD

(71) Applicant: KYOCERA CORPORATION, Kyoto (JP)

(72) Inventors: Hiroyuki Adachi, Kawasaki (JP); Kugo Morita, Higashiomi (JP)

(73) Assignee: KYOCERA Corporation, Kyoto (JP)

(*) Notice: Subject to any disclaimer, the term of this patent is extended or adjusted under 35 U.S.C. 154(b) by 0 days.

(21) Appl. No.: 15/726,176

(22) Filed: Oct. 5, 2017

(65) Prior Publication Data
US 2018/0048986 A1 Feb. 15, 2018

Related U.S. Application Data

(63) Continuation of application No. PCT/JP2016/061326, filed on Apr. 6, 2016.
(Continued)

(51) Int. Cl.
*H04W 4/00* (2018.01)
*H04W 4/70* (2018.01)
(Continued)

(52) U.S. Cl.
CPC .............. *H04W 4/70* (2018.02); *H04W 8/00* (2013.01); *H04W 8/005* (2013.01); *H04W 8/065* (2013.01);
(Continued)

(58) Field of Classification Search
CPC ....... H04W 4/005; H04W 4/70; H04W 72/02; H04W 76/023; H04W 76/14; H04W 8/00;
(Continued)

(56) References Cited

U.S. PATENT DOCUMENTS

2006/0111099 A1* 5/2006 Abdel-Kader .... H04L 29/06027
455/421
2008/0130596 A1* 6/2008 Kalhan ................. H04W 88/10
370/338
(Continued)

FOREIGN PATENT DOCUMENTS

WO 2015/019940 A1 2/2015

OTHER PUBLICATIONS

International Search Report issued in PCT/JP2016/061326; dated Jun. 28, 2016.
Written Opinion issued in PCT/JP2016/061326; dated Jun. 28, 2016.
3rd Generation Partnership Project;Technical Specification Group Services and System Aspects; Proximity-based services (ProSe); Stage 2; 3GPP TS 23.303 V12.4.0; Mar. 2015; pp. 1-63; Release 12; 3GPP Organizational Partners.
(Continued)

*Primary Examiner* — Abdelillah Elmejjarmi
(74) *Attorney, Agent, or Firm* — Studebaker & Brackett PC

(57) ABSTRACT

A radio terminal according to an embodiment comprises: a controller configured to execute processing of establishing connection with a network for relaying using a Device to Device (D2D) proximity service; a transmitter configured to transmit a discovery message for the relaying, after the connection is established; and a receiver configured to receive a request message from another radio terminal that has received the discovery message, wherein the request message includes an identifier of the another radio terminal. The controller executes control of transmitting the identifier of the another radio terminal, to a network apparatus included in an Evolved Packet Core (EPC), as an identifier of a remote node to which data is relayed by the relaying. The controller executes control of further transmitting the identifier of the another radio terminal to the network apparatus, based on non-reception of a predetermined message from the another radio terminal.

2 Claims, 18 Drawing Sheets

Related U.S. Application Data

(60) Provisional application No. 62/145,677, filed on Apr. 10, 2015.

(51) Int. Cl.
*H04W 8/00* (2009.01)
*H04W 92/18* (2009.01)
*H04W 8/06* (2009.01)
*H04W 76/14* (2018.01)
*H04W 72/02* (2009.01)
*H04W 88/04* (2009.01)

(52) U.S. Cl.
CPC ........... *H04W 72/02* (2013.01); *H04W 76/14* (2018.02); *H04W 88/04* (2013.01); *H04W 92/18* (2013.01)

(58) Field of Classification Search
CPC ..... H04W 8/005; H04W 8/065; H04W 88/04; H04W 92/18
See application file for complete search history.

(56) References Cited

U.S. PATENT DOCUMENTS

| | | | |
|---|---|---|---|
| 2014/0213186 A1* | 7/2014 | Gage | H04W 4/21 455/41.2 |
| 2015/0029866 A1* | 1/2015 | Liao | H04W 4/023 370/241 |
| 2016/0183212 A1 | 6/2016 | Suzuki et al. | |

OTHER PUBLICATIONS

Huawei; Service continuity for Prose; SA WG2 Temporary Document; SA WG2 Meeting #108; S2-150822; Apr. 13-17, 2015; pp. 1-5; San Jose Del Cabo, Mexico.

Intel; Remote UE visibility at the EPC; SA WG2 Temporary Document; SA WG2 Meeting #109; S2-151758; May 25-29, 2015; pp. 1-3; Fukuoka, Japan.

KYOCERA; Consideration of ProSe UE-to-Network Relays; 3GPP TSG-RAN WG2 #89-bis; R2-151530; Apr. 20-24, 2015; pp. 1-8; Bratislava, Slovak Republic.

Supplementary European Search Report issued by the European Patent Office dated Dec. 15, 2017, which corresponds to EP16776596.5-1854 and is related to U.S. Appl. No. 15/726,176.

Communication pursuant to Article 94(3) EPC issued by the European Patent Office dated Jan. 26, 2018, which corresponds to EP16776596.5-1214 and is related to U.S. Appl. No. 15/726,176.

3rd Generation Partnership Project; Technical Specification Group Services and System Aspects; Study on architecture enhancements to support Proximity-based Services (ProSe), 3GPP TR 23.703 V12.0.0, Feb. 2014, pp. 1-324, Release 12, 3GPP Organizational Partners.

Broadcom Corporation, UE-to-network relay clarification, SA WG2 Meeting #102, Mar. 24-28, 2014, pp. 1-4, S2-141193, St. Julian's, Malta.

An Office Action issued by the Japanese Patent Office dated Jan. 23, 2018, which corresponds to Japanese Patent Application No. 2017-511038 and is related to U.S. Appl. No. 15/726,176, with English language Concise Explanation.

* cited by examiner

ALT.1
EACH DRB ASSOCIATED WITH ONE ProSe BEARER

ALT.2
THE DRB ASSOCIATED WITH MULTIPLE ProSe BEARERS

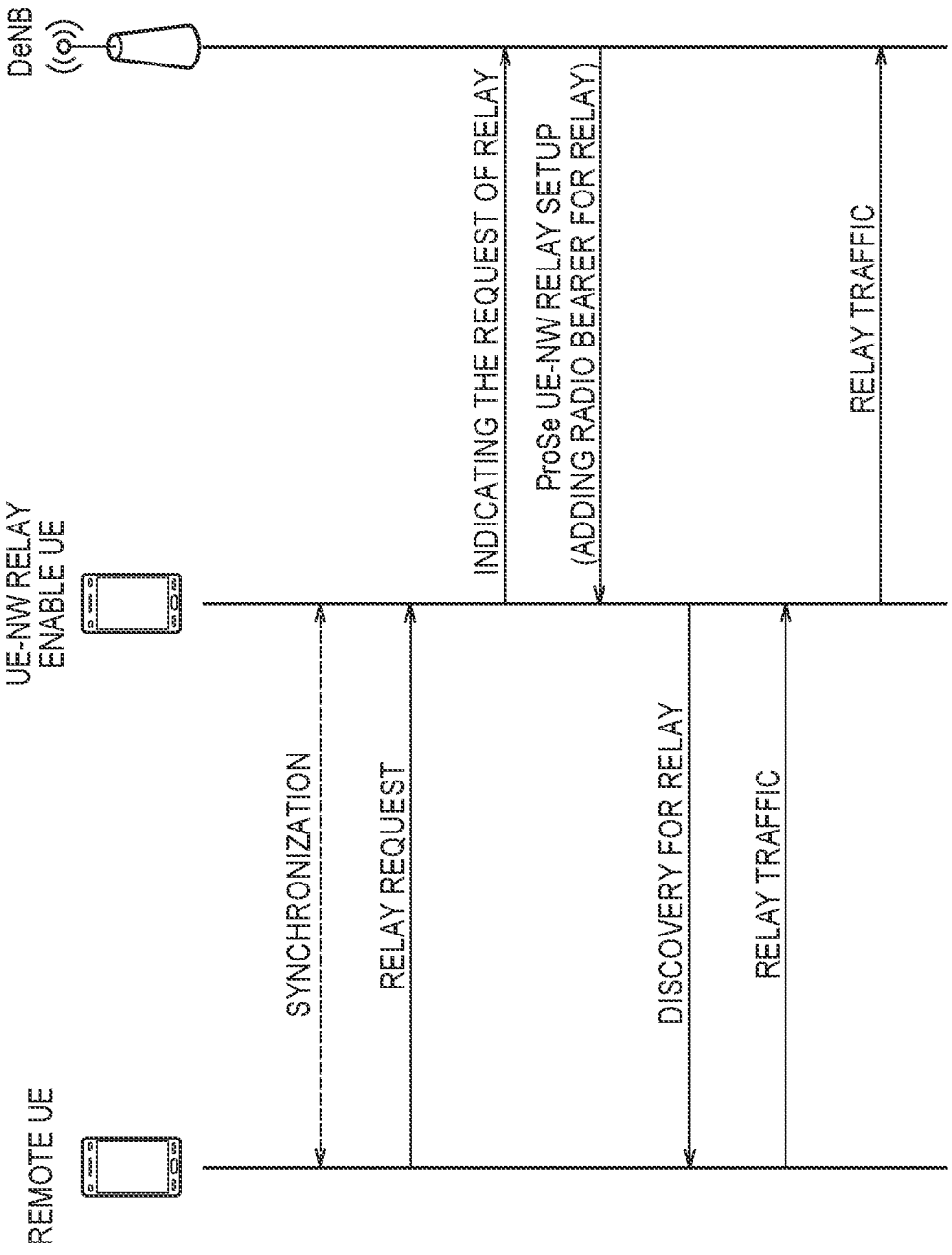

RADIO TERMINAL AND CONTROL METHOD

RELATED APPLICATIONS

This application is a continuation application of international application PCT/JP2016/061326, filed Apr. 6, 2016, which claims benefit of U.S. Provisional Application 62/145677, filed Apr. 10, 2015, the entirety of all applications hereby expressly incorporated by reference.

TECHNICAL FIELD

The subject application relates to a radio terminal, and a control method.

BACKGROUND ART

In the 3rd Generation Partnership Project (3GPP), which is a mobile communication system standardization project, the formulation of specifications of a Device to Device Proximity Service (D2D ProSe) is promoted.

Here, as one of functions of the D2D ProSe, there is a function (ProSe UE-to-Network Relaying) of relaying data between a radio terminal (remote user equipment (UE)) located outside the coverage of a cell and a network, using the D2D ProSe, by another radio terminal (ProSe UE-to-Network Relay).

SUMMARY

A radio terminal according to an embodiment comprises: a controller configured to execute processing of establishing connection with a network for relaying using a Device to Device (D2D) proximity service; a transmitter configured to transmit a discovery message for the relaying, after the connection is established; and a receiver configured to receive a request message from another radio terminal that has received the discovery message, wherein the request message includes an identifier of the another radio terminal. The controller executes control of transmitting the identifier of the another radio terminal, to a network apparatus included in an Evolved Packet Core (EPC), as an identifier of a remote node to which data is relayed by the relaying. The controller executes control of further transmitting the identifier of the another radio terminal to the network apparatus, based on non-reception of a predetermined message from the another radio terminal.

A control method according to an embodiment comprises: a step of executing, by a first radio terminal, processing of establishing connection with a network for relaying using a Device to Device (D2D) proximity service; a step of transmitting, by the first radio terminal, a discovery message for the relaying, after the connection is established; and a step of receiving, by the first radio terminal, a request message from a second radio terminal that has received the discovery message, wherein the request message includes an identifier of the second radio terminal. The control method further comprises: a step of transmitting, by the first radio terminal, the identifier of the second radio terminal, to a network apparatus included in an Evolved Packet Core (EPC), as an identifier of a remote node to which data is relayed by the relaying; and a step of further transmitting, by the first radio terminal, the identifier of the second radio terminal to the network apparatus, based on non-reception of a predetermined message from the second radio terminal.

BRIEF DESCRIPTION OF DRAWINGS

FIG. 21 is a diagram for illustrating a remote UE start procedure of UE-to-Network relaying.

DESCRIPTION OF EMBODIMENTS

Overview of Embodiment

Figure 1:
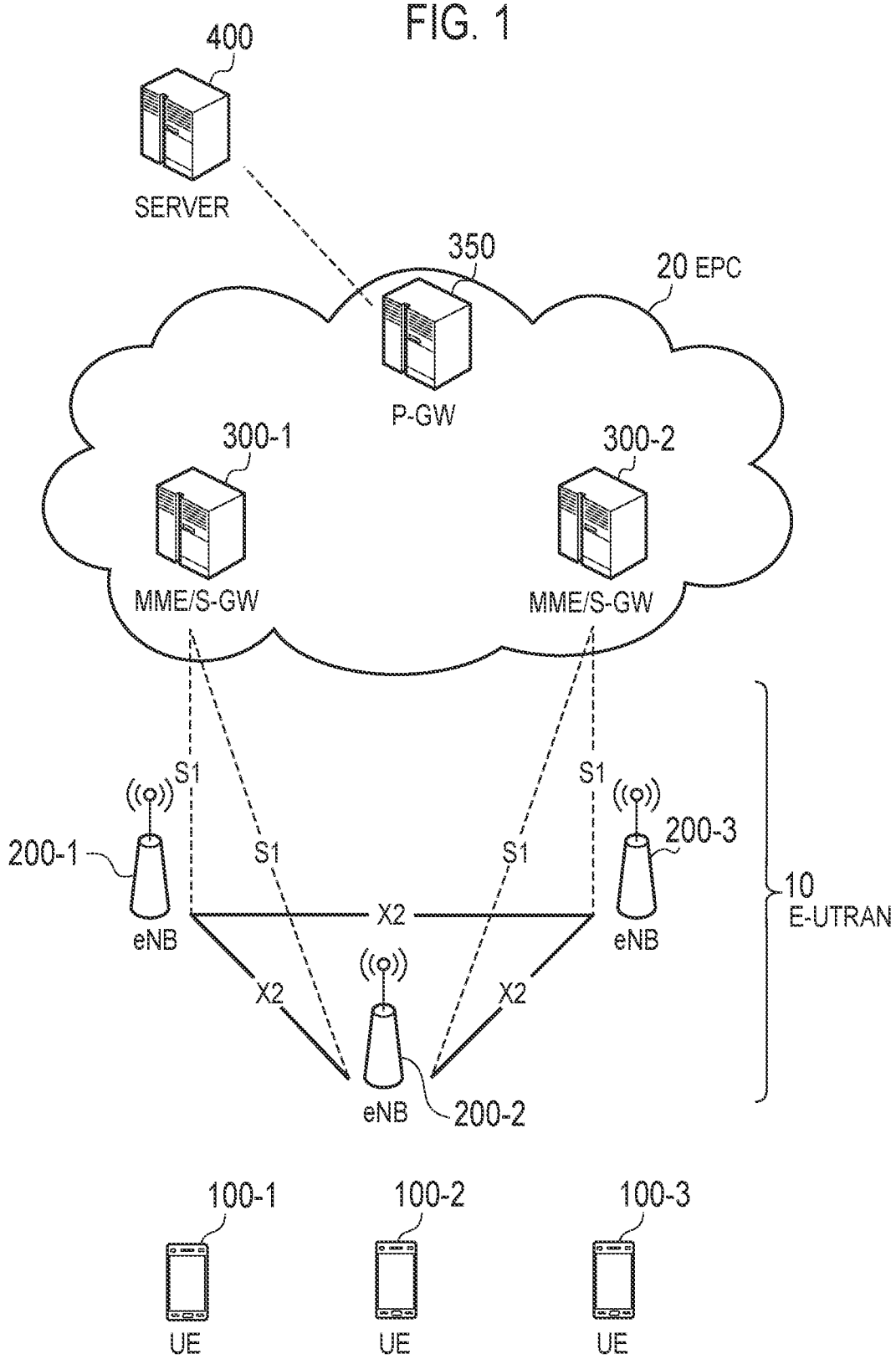
FIG. 1 is a configuration diagram of a Long Term Evolution (LTE) system.

In the present circumstances, UE-network relaying may fail to be effectively utilized because specifications for effectively utilizing the UE-network relaying have not been adequately formulated.

A radio terminal according to an embodiment comprises: a controller configured to execute processing of establishing connection with a network for relaying using a Device to Device (D2D) proximity service; a transmitter configured to transmit a discovery message for the relaying, after the connection is established; and a receiver configured to receive a request message from another radio terminal that has received the discovery message. The request message includes an identifier of the another radio terminal. The controller executes control of transmitting the identifier of the another radio terminal, to a network apparatus included in an Evolved Packet Core (EPC), as an identifier of a remote node to which data is relayed by the relaying.

The controller may determine that the another radio terminal is in vicinity, based on reception of a predetermined message from the another radio terminal.

The controller executes control of further transmitting the identifier of the another radio terminal to the network apparatus, based on non-reception of a predetermined message from the another radio terminal.

A control method according to an embodiment comprises: a step of executing, by a first radio terminal, processing of establishing connection with a network for relaying using a Device to Device (D2D) proximity service; a step of transmitting, by the first radio terminal, a discovery message for the relaying, after the connection is established; and a step of receiving, by the first radio terminal, a request message from a second radio terminal that has received the discovery message. The request message includes an identifier of the second radio terminal. The control method further comprises a step of transmitting, by the first radio terminal, the identifier of the second radio terminal, to a network apparatus included in an Evolved Packet Core (EPC), as an identifier of a remote node to which data is relayed by the relaying.

A radio terminal according to an embodiment may comprise: a receiver configured to receive, from a base station, a notification for causing the radio terminal to execute UE-network relaying in which the radio terminal relays data between another radio terminal located outside a coverage of cell and a network by D2D proximity service; and a controller configured to start an operation for executing the UE-network relaying based on a reception of the notification.

The radio terminal may further comprise a transmitter configured to transmit, to the base station, capability information indicating that the radio terminal has capability for executing the UE-network relaying.

The receiver may receive configuration information for establishing a bearer used for the UE-network relaying together with the notification. The controller may start an establishment of the bearer based on the configuration information.

The radio terminal may further comprise a transmitter configured to transmit, to the base station, a response indicating whether or not to agree with execution of the UE-network relaying.

A base station according to an embodiment may comprise a transmitter configured to transmit, to a radio terminal, a notification for causing the radio terminal to execute UE-network relaying in which the radio terminal relays data between another radio terminal located outside the coverage and a network by D2D proximity service; and The transmitter may transmit the notification to the radio terminal if capability information indicating that the radio terminal has capability for executing the UE-network relaying is received from the radio terminal.

The base station may further comprise a controller configured to start an operation for executing the UE-network relaying if a response indicating agreement of an execution of the UE-network relaying is received.

A radio terminal according to an embodiment may comprise a transmitter configured to transmit relay information to another radio terminal if the user terminal locates inside a coverage of a cell, wherein the relay information indicates that the radio terminal can execute UE-network relaying in which the radio terminal relays data between another radio terminal located outside the coverage of the cell and a network by D2D proximity service.

The transmitter may start a transmission of the relay information if requested by a base station to transmit a synchronization signal in the D2D proximity service.

The transmitter may transmit the relay information during execution of direct communication by the D2D proximity service or during execution of direct discovery for discovering a terminal of proximity of the radio terminal by the D2D proximity service.

The transmitter may transmit the relay information only if a reception level of a radio signal from the cell is less than a threshold value.

The transmitter may notify a base station configured to manage the cell of a reception of a request indicating that data is desired to be relayed by the UE-network relaying if the request is received from the another radio terminal.

A network apparatus may be a network apparatus used in a communication system comprising a first radio terminal and a second radio terminal. The network apparatus may comprise: a controller configured to reserve an identifier of the first radio terminal as a relay node in relay table, wherein the relay node relays data by D2D proximity service in a state where a bearer is not established between a remote node to which data is relayed by the D2D proximity service and a packet data network gateway. The controller may reserve an identifier of the second radio terminal as the remote node in the relay table in association with the identifier of the first radio terminal. The controller may notify the first radio terminal of data addressed to the second radio terminal on a basis of the relay table.

The network apparatus may further comprise a receiver configured to receive, from the first radio terminal, a message indicating that the second radio terminal is the remote node. The controller may reserve the identifier of the second radio terminal included in the message, in the relay table in response to a reception of the message.

The network apparatus may further comprises a receiver configured to receive, from the first radio terminal, data of a third radio terminal not associated with the identifier of the first radio terminal in the relay table. The controller may reserve an identifier of the third radio terminal in the relay table in association with the identifier of the first radio terminal.

The network apparatus may further comprise a receiver configured to receive, from the first radio terminal, a message indicating the second radio terminal is no longer the remote node. The controller may discard association between the identifier of the first radio terminal and the identifier of the second radio terminal in response to a reception of the message.

The network apparatus may further comprise a receiver configured to receive, from the forth radio terminal being the relay node, a message indicating that the second radio terminal is the remote node. The controller may associate identifier of the second radio terminal with an identifier of the fourth second radio terminal in response to a reception of the message. The controller may reserve the association in the relay table. The controller may discard the association between the identifier of the first radio terminal and the identifier of the second radio terminal.

A radio terminal according to an embodiment may comprise a controller configured to relay data of another radio terminal being a remote node, as the relay node configured to relay data by D2D proximity service in a state where a bearer is not established between the remote node to which data is relayed by the D2D proximity service and a packet data network gateway. The controller may relay, to the another radio terminal, data addressed to the another radio terminal and received from a network apparatus reserving association between the relay node and remote node.

The controller may notify the network apparatus of a first message indicating that the another radio terminal is the remote mode and including an identifier of the another radio terminal.

The controller may notify the network apparatus of the first message if the controller decides that the radio terminal is to be the relay node relaying data of the another radio terminal.

The radio terminal may further comprise a receiver configured to periodically receive a predetermined message from the another radio terminal during the radio terminal being the relay node. The controller may notify the network apparatus of the first message in response to a reception of the predetermined message.

The predetermined message may be a discovery message for a terminal of proximity by the D2D proximity service. The receiver receives the discovery message at a second cycle longer than a first cycle to discovery the terminal of the proximity.

The controller may notify the network apparatus of a second message indicating that the another radio terminal is no longer the remote node.

The controller may notify the network apparatus of the second message if the predetermined message is not received for a certain period.

The controller may notify the network apparatus of the second message if the data addressed to the another radio terminal cannot be relayed to the another radio terminal.

A radio terminal according to an embodiment may comprise a controller configured to execute UE-network relaying in which the radio terminal relays data between another radio terminal located outside a coverage of cell and a network by D2D proximity service. The controller may notify a network apparatus and/or the another radio terminal that new relaying based on the UE-network relaying is not executed, if a load level based on the UE-network relaying exceeds a threshold value, wherein the network apparatus manages a relay node executing the UE-network relaying.

The radio terminal may further comprise a controller configured to transmit a synchronization signal in the D2D proximity service. The controller may notify the another user terminal that new relaying based on the UE-network relaying is not executed, by changing a signal sequence of the synchronization signal in the D2D proximity service.

A network apparatus according to an embodiment may comprise: a receiver configured to receive, from a first radio terminal, a notification that a load level based on UE-network relaying in which the radio terminal relays data between another radio terminal located outside a coverage of cell and a network by D2D proximity service exceeds a threshold value; and a transmitter configured to transmit, to a second radio terminal, a notification for causing the UE-network relaying to be executed, in response to a reception of the notification.

A radio terminal according to an embodiment may comprise: a controller configured to relay data of a plurality of radio terminals by D2D proximity service in a state where a bearer is not established between a remote node to which data is relayed by the D2D proximity service and a packet data network gateway; and a receiver configured to receive, from a base station, information configured in a common for the plurality of radio terminals. The controller relays the data of the plurality of radio terminals on a basis of the information configured in the common.

A processor according to an embodiment is a processor for controlling a radio terminal. The processor for controlling a radio terminal, comprises: a memory communicatively coupled to the processor and including instructions, such that when executed by the processor performs the processes of: establishing connection with a network for relaying using a Device to Device (D2D) proximity service; transmitting a discovery message for the relaying, after the connection is established; receiving a request message from another radio terminal that has received the discovery message, wherein the request message includes an identifier of the another radio terminal; transmitting the identifier of the another radio terminal, to a network apparatus included in an Evolved Packet Core (EPC), as an identifier of a remote node to which data is relayed by the relaying; and further transmitting the identifier of the another radio terminal to the network apparatus, based on non-reception of a predetermined message from the another radio terminal.

Embodiment

Mobile Communication System

Hereinafter, an LTE system being a mobile communication system according to a first embodiment will be described. FIG. 1 is a configuration diagram of an LTE system.

As shown in FIG. 1, the LTE system comprises UEs (User Equipments) 100, E-UTRAN (Evolved Universal Terrestrial Radio Access Network) 10, and EPC (Evolved Packet Core) 20. In addition, a server 400 is provided in an external network not managed by an operator of a cellular network.

The UE 100 corresponds to a radio terminal. The UE 100 is a mobile communication device. The UE 100 performs radio communication with a connected cell (a serving cell). Configuration of the UE 100 will be described later.

The E-UTRAN 10 corresponds to a radio access network. The E-UTRAN 10 includes eNBs 200 (evolved Node-Bs). The eNB 200 corresponds to a base station. The eNBs 200 are connected mutually via an X2 interface. Configuration of the eNB 200 will be described later.

The eNB 200 manages a cell or a plurality of cells. The eNB 200 performs radio communication with the UE 100 that establishes a connection with the cell of the eNB 200. The eNB 200, for example, has a radio resource management (RRM) function, a function of routing user data (hereinafter, simply referred to as "data"), and a measurement control function for mobility control and scheduling. The "cell" is used as a term indicating a minimum unit of a radio communication area. It may be also used as a term indicating a function of performing radio communication with the UE 100.

The EPC 20 corresponds to a core network. The EPC 20 comprises MME (Mobility Management Entity)/S-GW (Serving-Gateway) 300 and a P-GW (Packet Data Network Gateway) 350. The MME performs various mobility controls and the like, for the UE 100. The S-GW performs control to transfer user data. The MME/S-GW 300 is connected to the eNB 200 via an S1 interface. The E-UTRAN 10 and the EPC 20 constitute a network. A packet data network gateway (P-GW) 350 performs control of relaying user data from the external network (and to the external network).

The server 400 corresponds to a network apparatus (D2D Server). The server 400 manages a relay node (ProSe UE-to-Network Relay) for relaying data between user equipments (UEs) 100 located outside the coverage of a cell, and a network (an E-UTRAN 10), using the D2D ProSe.

Figure 2:
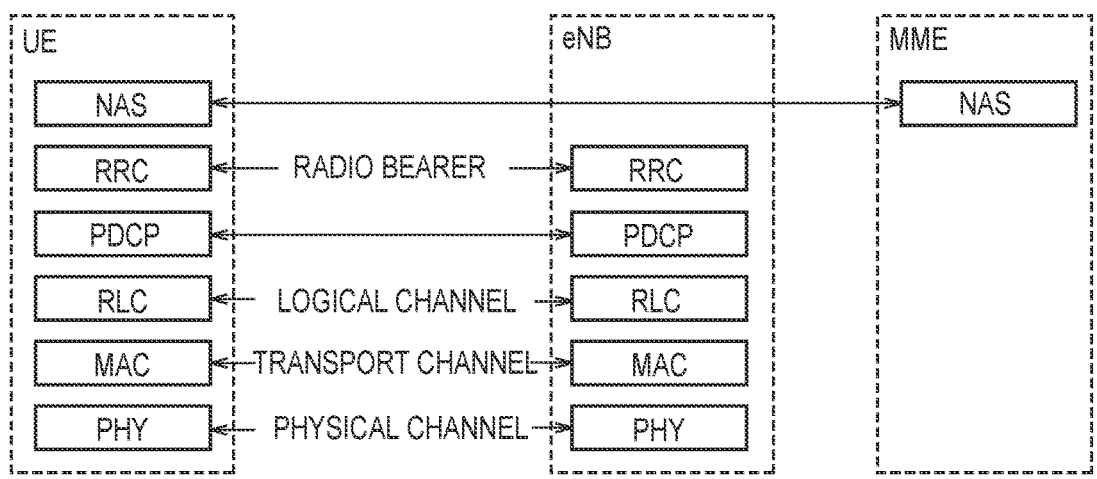
FIG. 2 is a protocol stack diagram of a radio interface in the LTE system.

FIG. 2 is a protocol stack diagram of a radio interface in the LTE system. As shown in FIG. 2, the radio interface protocol is classified into a layer 1 to a layer 3 of an OSI reference model. The layer 1 is a physical (PHY) layer. The layer 2 includes MAC (Medium Access Control) layer, RLC (Radio Link Control) layer, and PDCP (Packet Data Convergence Protocol) layer. The layer 3 includes RRC (Radio Resource Control) layer.

The PHY layer performs encoding and decoding, modulation and demodulation, antenna mapping and demapping, and resource mapping and demapping. Between the PHY layer of the UE 100 and the PHY layer of the eNB 200, data and a control signal are transmitted through the physical channel.

The MAC layer performs priority control of data, a retransmission process by hybrid ARQ (HARQ), a random access procedure, and the like. Between the MAC layer of the UE 100 and the MAC layer of the eNB 200, data and a control signal are transmitted via a transport channel. The MAC layer of the eNB 200 includes a scheduler. The scheduler decides a transport format of an uplink and a downlink (a transport block size, a modulation and coding scheme (MCS)) and an allocated resource block to the UE 100.

The RLC layer transmits data to an RLC layer of a reception side by using the functions of the MAC layer and the PHY layer. Between the RLC layer of the UE 100 and the RLC layer of the eNB 200, data and a control signal are transmitted via a logical channel.

The PDCP layer performs header compression and decompression, and encryption and decryption.

The RRC layer is defined only in a control plane handling a control signal. Between the RRC layer of the UE 100 and the RRC layer of the eNB 200, a message (an RRC message) for various types of setting is transmitted. The RRC layer controls the logical channel, the transport channel, and the physical channel in response to establishment, re-establishment, and release of a radio bearer. When a connection (an RRC connection) is established between the RRC layer of the UE 100 and the RRC layer of the eNB 200, the UE 100 is in an RRC connected state (a connected state). When the connection is not established between the RRC layer of the UE 100 and the RRC layer of the eNB 200, the UE 100 is in an RRC idle state (an idle state).

NAS (Non-Access Stratum) layer positioned above the RRC layer performs session management, mobility management and the like.

Figure 3:
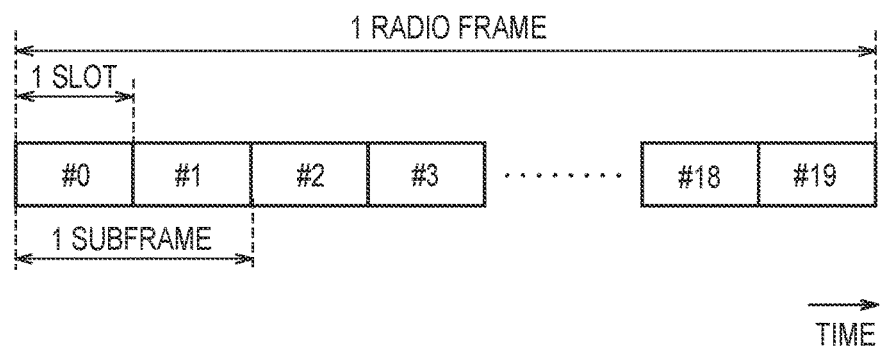
FIG. 3 is a configuration diagram of a radio frame used in the LTE system.

FIG. 3 is a configuration diagram of a radio frame used in the LTE system. In the LTE system, OFDMA (Orthogonal Frequency Division Multiplexing Access) is employed in a downlink (DL). SC-FDMA (Single Carrier Frequency Division Multiple Access) is employed in an uplink (UL).

As shown in FIG. 3, the radio frame is configured by 10 subframes arranged in a time direction. Each subframe is configured by two slots arranged in the time direction. Each subframe has a length of 1 ms. Each slot has a length of 0.5 ms. Each subframe includes a plurality of resource blocks (RBs) in a frequency direction. Each subframe includes a plurality of symbols in the time direction. Each resource block includes a plurality of subcarriers in the frequency direction. A resource element (RE) is configured by one symbol and one subcarrier. In addition, among radio resources (time-frequency resources) allocated to the UE 100, a frequency resource is specified by a resource block and a time resource is specified by a subframe (or slot).

In the downlink, an interval of several symbols at the head of each subframe is a region mainly used as a physical downlink control channel (PDCCH) for transmission of a downlink control signal. The details of the PDCCH will be described later. Furthermore, the remaining part of each subframe is a region which can be mainly used as a physical downlink shared channel (PDSCH) for transmission of a downlink data.

In the uplink, both end portions in the frequency direction of each subframe are regions mainly used as a physical uplink control channel (PUCCH) for transmission of an uplink control signal. Furthermore, the remaining part of each subframe is a region which can be mainly used as a physical uplink shared channel (PUSCH) for transmission of an uplink data.

D2D Proximity Service

The D2D ProSe (D2D proximity service) will be described below. In the D2D ProSe, a plurality of UEs 100 transmit and receive various signals via a direct radio link not passing through an evolved Node-B (eNB) 200. The direct radio link in the D2D ProSe will be referred to as a "sidelink".

The "sidelink" is a UE-to-UE interface for direct discovery and direct communication. The "sidelink" corresponds to a PC5 interface. The PC5 is a reference point between UEs that can use the D2D ProSe used for control for UE-NW relaying using direct discovery, direct communication, and the D2D ProSe, and for a user plane. The PC5 interface is a UE-to-UE interface in the D2D ProSe.

As modes of the D2D ProSe, two modes including "direct discovery" and "direct communication" are defined.

The direct discovery is a mode for searching for another UE by directly transmitting, between UEs, a discovery signal without a specified specific destination. In addition, the direct discovery is a procedure for discovering another UE 100 in the neighborhood of the UE 100, using a direct radio signal in an Evolved Universal Terrestrial Radio Access (E-UTRA) via the PC5. Alternatively, the direct discovery is a procedure employed by the UE 100 that can execute the D2D ProSe for discovering another UE 100 that can execute the D2D ProSe, using only the capability of two UEs 100 based on the E-UTRA technique. The direct discovery is supported only if the UE 100 is provided with a service by the E-UTRAN 10 (the eNB 200 (cell)). If the UE 100 is connected to the cell (the eNB 200) or exists in the cell, the service is provided by the E-UTRAN.

Resource allocation types for transmitting (announcement of) a discovery signal (discovery message) include a "type 1" in which the UE 100 selects a radio resource, and a "type 2 (type 2B)" in which the eNB 200 selects a radio resource.

A "direct discovery (Sidelink Direct Discovery)" protocol stack includes a physical (PHY) layer, a medium access control (MAC) layer, and a ProSe protocol. Between the PHY layer of a UE (A) and the PHY layer of a UE (B), a discovery signal is transmitted via a physical channel referred to as a physical sidelink discovery channel (PS-DCH). Between the MAC layer of the UE (A) and the MAC layer of the UE (B), a discovery signal is transmitted via a transport channel referred to as a sidelink discovery channel (SL-DCH).

The direct communication is a mode for directly transmitting data between UEs by specifying a specific destination (destination group). In addition, the direct communication is communication performed between two or more UEs that can execute the D2D ProSe, through user plane transmission that uses the E-UTRA technique via a route not passing through any network node.

Resource allocation types of the direct communication include a "mode 1" in which the eNB 200 specifies a radio resource of the direct communication, and a "mode 2" in which the UE 100 selects a radio resource of the direct communication.

A direct communication protocol stack includes a physical (PHY) layer, a MAC layer, a radio link control (RLC) layer, and a packet data convergence protocol (PDCP) layer. Between the PHY layer of the UE (A) and the PHY layer of the UE (B), a control signal is transmitted via a physical sidelink control channel (PSCCH), and data is transmitted via a physical sidelink shared channel (PSSCH). In addition, a synchronization signal and the like may be transmitted via a physical sidelink broadcast channel (PSBCH). Between the MAC layer of the UE (A) and the MAC layer of the UE (B), data is transmitted via a transport channel referred to as a sidelink shared channel (SL-SCH). Between the RLC layer of the UE (A) and the RLC layer of the UE (B), data is transmitted via a logical channel referred to as a sidelink traffic channel (STCH).

UE-Network Relaying

Figure 4:
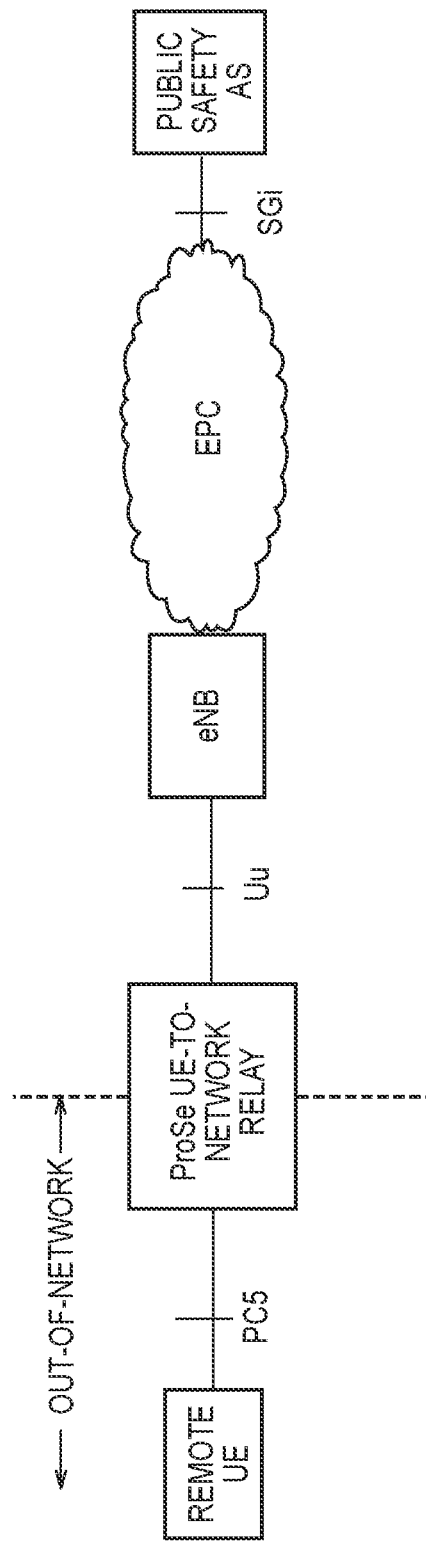
FIG. 4 is a diagram for illustrating UE-network relaying according to an embodiment.

The UE-network relaying (ProSe UE-to-Network Relaying) will be described below using FIG. 4. FIG. 4 is a diagram for illustrating the UE-network relaying according to an embodiment.

In FIG. 4, a remote UE is a UE 100 located outside the coverage of the cell. The remote UE is located outside the network. Thus, the remote UE is a UE 100 not provided with a service by the E-UTRAN 10. In addition, the remote UE 100 can communicate with a packet data network (PDN) via a relay UE to be described later. The remote UE may be a UE for Public Safety (ProSe-enabled Public Safety UE).

In addition, the "ProSe-enabled Public Safety UE" has a configuration in which a home public land mobile network (HPLMN) allows use for public safety. The "ProSe-enabled Public Safety UE" can use the D2D ProSe, and supports procedures in the D2D ProSe and a specific capability for public safety.

The relay UE (ProSe UE-to Network Relay) provides a function of supporting connectivity for performing unicast of a service for the remote UE. Thus, the relay UE relays data (traffic) of the remote UE between the remote UE and the network using the D2D ProSe. More specifically, the relay UE relays data (uplink traffic) received from the remote UE via the PC5 interface, to the eNB 200 via a Uu interface (LTE-Uu). In addition, the relay UE relays data (downlink traffic) received from the eNB 200 via the Uu interface, to the remote UE via the PC5 interface.

In addition, the relay UE can provide a comprehensive function capable of relaying traffic of an arbitrary type that is related to communication for public safety.

The relay UE and the remote UE can transmit data and control signals between the PHY layers. Similarly, the relay UE and the remote UE can transmit data and control signals between the MAC layers, the RLC layers, and the PDCP layers. Furthermore, the relay UE may have an IP relay (IP-Relay) layer as a higher layer of the PDCP layer. The remote UE may have an IP layer as a higher layer of the PDCP layer. The relay UE and the remote UE can transmit data and control signals between the IP relay layer and the IP layer. In addition, the relay UE can transmit data between the IP relay layer and the IP layer of the IP-GW 350.

In the UE-network relaying, data can be relayed through the direct communication. In this case, the communication on the PC5 is connectionless. Alternatively, in the UE-network relaying, data may be enabled to be relayed through the direct discovery.

Radio Terminal

Figure 5:
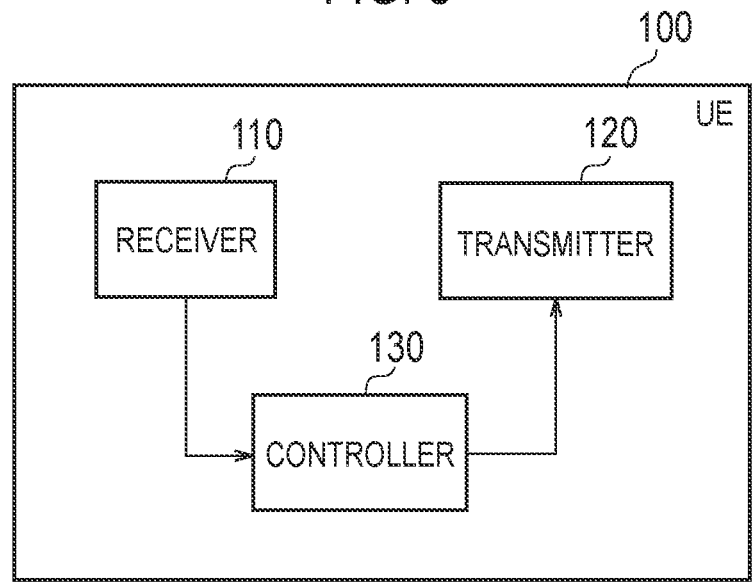
FIG. 5 is a block diagram of a user equipment (UE) 100.

The UE 100 (radio terminal) according to the embodiment will be described below. FIG. 5 is a block diagram of the UE 100. As illustrated in FIG. 5, the UE 100 comprises a receiver 110, a transmitter 120, and a controller 130.

The receiver 110 performs various types of reception under the control of the controller 130. The receiver 110 comprises an antenna and a receiving device. The receiving device converts a radio signal received by the antenna, into a baseband signal (reception signal), and outputs the baseband signal to the controller 130.

In addition, if the UE 100 is "ProSe-enabled Public Safety UE", the receiver 110 can simultaneously receive radio signals in two different frequencies. For example, the UE 100 comprises two receiving devices (2 RX Chain). The UE 100 can receive a radio signal for cellular using one receiving device, and can receive a radio signal for the D2D ProSe using the other receiving device.

The transmitter 120 performs various types of transmission under the control of the controller 130. The transmitter 120 comprises an antenna and a transmission device. The transmission device converts a baseband signal (transmission signal) output by the controller 130, into a radio signal, and transmits the radio signal from the antenna.

The controller 130 performs various types of control in the UE 100. The controller 130 comprises a processor and a memory. The memory stores a program to be executed by the processor, and information to be used in processing performed by the processor. The processor comprises a baseband processor that performs modulation/demodulation and encoding/decoding of a baseband signal, and the like, and a central processing unit (CPU) that executes programs stored in the memory, to perform various types of processing. The processor may comprise a codec that performs encoding/decoding of an audio/video signal. The processor executes various types of processing to be described later and various types of communication protocols mentioned above.

Base Station

Figure 6:
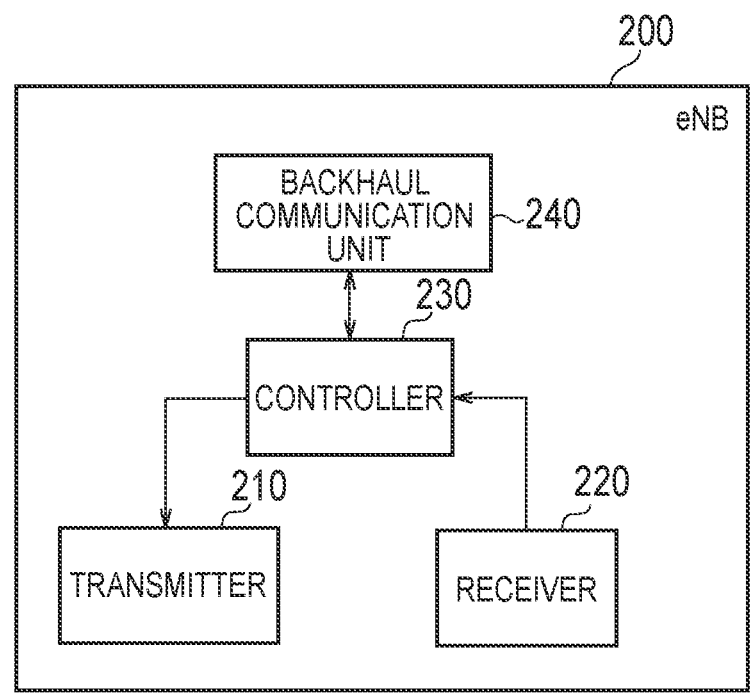
FIG. 6 is a block diagram of an evolved Node-B (eNB) 200.

The eNB 200 (base station) according to the embodiment will be described below. FIG. 6 is a block diagram of the eNB 200. As illustrated in FIG. 6, the eNB 200 comprises a transmitter 210, a receiver 220, a controller 230, and a backhaul communication unit 240.

The transmitter 210 performs various types of transmission under the control of the controller 230. The transmitter 210 comprises an antenna and a transmission device. The transmission device converts a baseband signal (transmission signal) output by the controller 230, into a radio signal, and transmits the radio signal from the antenna.

The receiver 220 performs various types of reception under the control of the controller 230. The receiver 220 comprises an antenna and a receiving device. The receiving device converts a radio signal received by the antenna, into a baseband signal (reception signal), and outputs the baseband signal to the controller 230.

The controller 230 performs various types of control in the eNB 200. The controller 230 comprises a processor and a memory. The memory stores a program to be executed by the processor, and information to be used in processing performed by the processor. The processor comprises a baseband processor that performs modulation/demodulation and encoding/decoding of a baseband signal, and the like, and a central processing unit (CPU) that executes programs stored in the memory, to perform various types of processing. The processor executes various types of processing to be described later and various types of communication protocols mentioned above.

The backhaul communication unit 240 is connected to a neighboring eNB 200 via an X2 interface. The backhaul communication unit 240 is connected to a MME/S-GW 300 via an S1 interface. The backhaul communication unit 240 is used for communication performed on the X2 interface, communication performed on the S1 interface, and the like.

Network Apparatus

Figure 7:
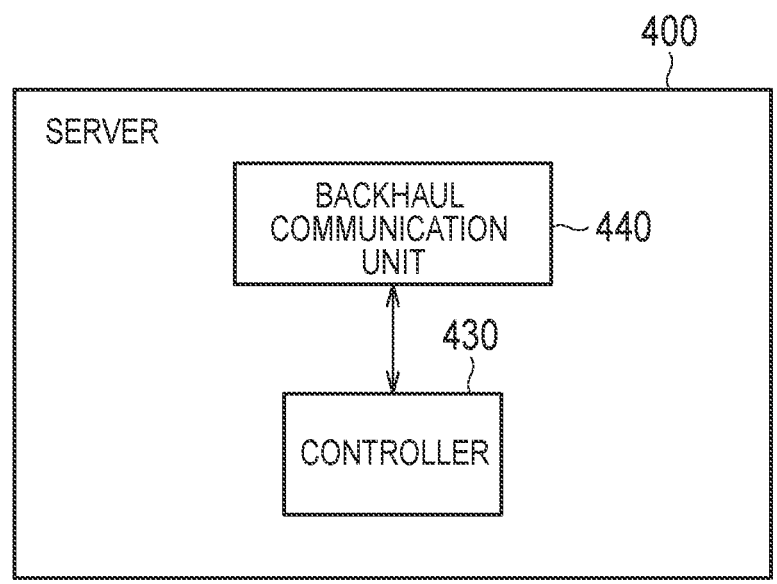
FIG. 7 is a block diagram of a server 400.

The server 400 (network apparatus) according to the embodiment will be described below. FIG. 7 is a block diagram of the server 400. As illustrated in FIG. 7, the server 400 includes a controller 430 and a backhaul communication unit 440.

The controller 430 performs various types of control in the server 400. The controller 430 includes a processor and a memory. The memory stores a program to be executed by the processor, and information to be used in processing performed by the processor. The processor includes a central processing unit (CPU) that executes programs stored in the memory, to perform various types of processing. The processor executes various types of processing to be described later and various types of communication protocols mentioned above.

The controller 430 can receive a notice from the UE 100 or transmit a notice to the UE 100, via the backhaul communication unit 440.

The backhaul communication unit 440 can receive a notice from the UE 100 or transmit a notice to the UE 100, by the control from the controller 430. The backhaul communication unit 440 corresponds to a transmitter and a receiver.

Operation According to Embodiment

Next, an operation according to the embodiment will be described. The redundant descriptions will be appropriately omitted.

(1) Configuration of Relay UE

Figure 8:
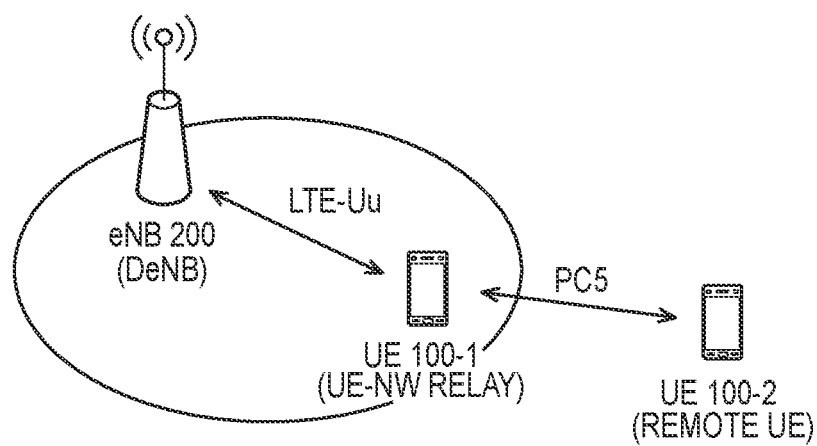
FIG. 8 is a diagram for illustrating an operation environment according to the embodiment.
Figure 9:
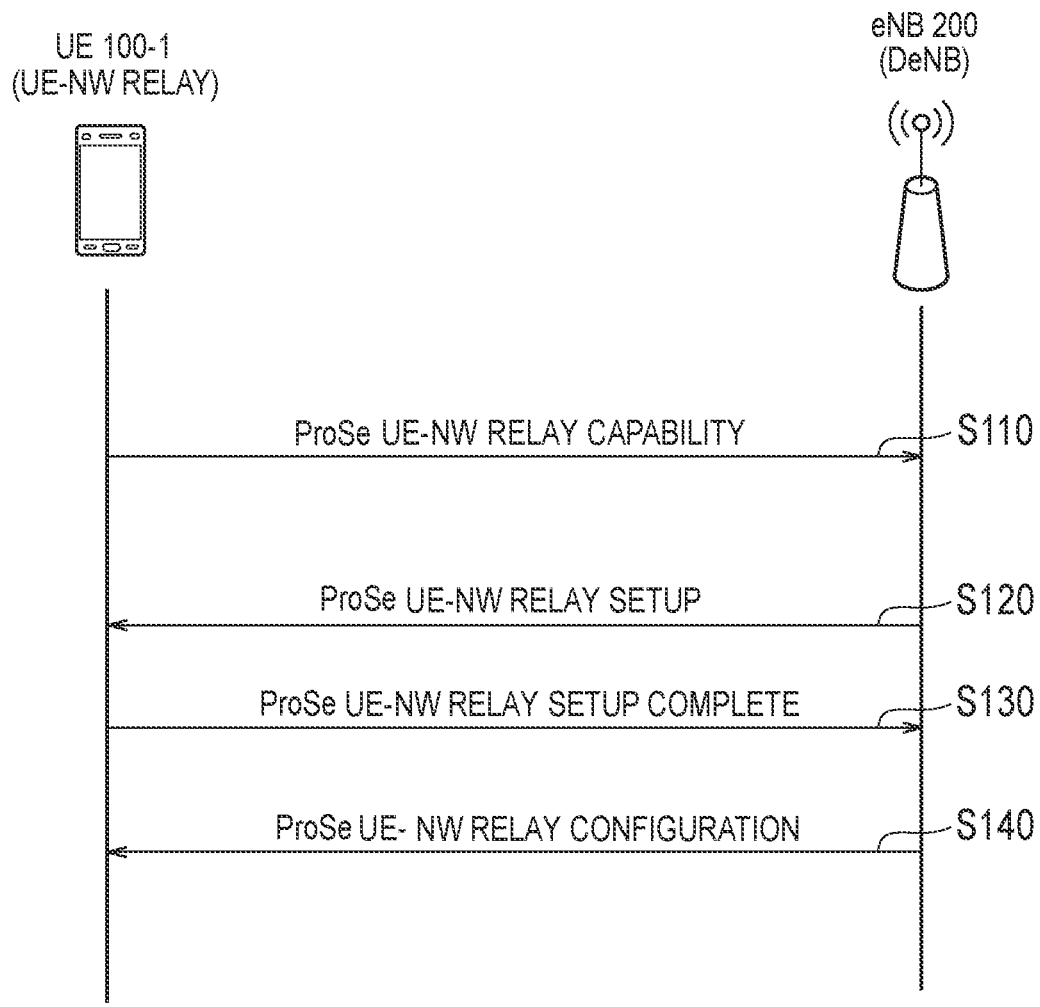
FIG. 9 is a sequence diagram for illustrating an operation (1) according to the embodiment.

The configuration of the relay UE will be described below using FIGS. 8 and 9. FIG. 8 is a diagram for illustrating an operation environment according to the embodiment. FIG. 9 is a sequence diagram for illustrating an operation (1) according to the embodiment.

First, the description will be given of a case in which the UE 100 executes existing relaying. The UE 100 executes the first attachment for relay node (RN) preconfiguration, with respect to a core network. The UE 100 executes the attachment not as a relay node but as a normal UE 100. By executing the attachment, the UE 100 acquires configuration information (e.g., initial configuration parameter) for relaying, from Operations And Management (OAM). After that, the UE 100 executes detachment.

Next, the UE 100 executes the second attachment for an RN operation. The UE 100 that has executed the detachment executes the attachment as a relay node. By executing the attachment, the UE 100 acquires configuration information related to radio resource control (RRC), and starts an operation as a relay node. As an interface with a donor eNB (DeNB) 200, the UE 100 being an existing relay node uses not the Uu interface (LTE-Uu) used between the normal UE 100 not being a relay node and the eNB 200, but a Un interface (LTE-Un).

In this manner, if existing relaying is executed, there is such a problem that relaying cannot be performed without the UE 100 attached as a relay node. In addition, for causing the UE 100 to function as an existing relay node, the detachment needs to be executed after configuration information is received from the OAM, and the attachment needs to be executed again. Thus, for causing a normal UE 100 to function as a relay node, a lot of time may be required.

If a procedure of the UE-network relaying that uses the D2D ProSe is a procedure similar to that of the existing relaying, the aforementioned problem may occur. As a result, the UE-network relaying may fail to be effectively utilized.

In addition, there is a high possibility that the D2D ProSe for public safety is used if a disaster occurs. It is therefore desirable that a time until the start of the UE-network relaying is short.

Thus, the following methods can be executed for solving the aforementioned problem. In addition, in principle, a "relay UE (relay node)" described below represents not an existing relay UE, but a relay UE in the UE-network relaying that uses the D2D ProSe.

As illustrated in FIG. 8, a UE 100-1 (UE-NW Relay) is located within the coverage of a cell managed by the eNB 200 (DeNB) (In coverage). The UE 100-1 has established RRC connection with the eNB 200. The UE 100-1 is in an RRC connected state. In addition, the eNB 200 is a donor eNB (DeNB) that can provide a service to a relay node.

As illustrated in FIG. 9, in step S110, the UE 100-1 transmits, to the eNB 200, capability information (ProSe UE-NW Relay Capability) indicating that the UE 100-1 has capability for executing the UE-network relaying. The capability information is information indicating that the UE 100-1 has capability of becoming a "ProSe UE-to Network Relay". The eNB 200 receives the capability information.

When establishing the RRC connection, the UE 100-1 may transmit the capability information to the eNB 200. Alternatively, the UE 100-1 may transmit the capability information to the eNB 200 in response to a request from the eNB 200.

In step S120, the eNB 200 transmits, to the UE 100-1, a notice for causing the UE 100-1 to execute the UE-network relaying (ProSe UE-NW Relay Setup). The UE 100-1 receives the notice.

Together with the "ProSe UE-NW Relay Setup", the eNB 200 may transmit configuration information for establishing a bearer (evolved packet system (EPS) bearer) used in the UE-network relaying that is to be described later. The eNB 200 may include the configuration information in a "ProSe UE-NW Relay Setup" message. Alternatively, the eNB 200 may include "ProSe UE-NW Relay Setup" and configuration information in a predetermined message, and transmit the predetermined message to the UE 100-1.

If the eNB 200 receives the capability information (ProSe UE-NW Relay Capability) from the UE 100-1, the eNB 200 may transmit "ProSe UE-NW Relay Setup" to the UE 100-1.

In addition, if the eNB 200 receives, from the UE 100-1, "Relay Interest Indication" to be described later, the eNB 200 may transmit "ProSe UE-NW Relay Setup" to the UE 100-1. Alternatively, if the eNB 200 receives, from another UE 100, "Relay overload indication" to be described later, the eNB 200 may transmit "ProSe UE-NW Relay Setup" to the UE 100-1.

If the UE 100-1 receives "ProSe UE-NW Relay Setup", the UE 100-1 can start an operation for executing the UE-network relaying. For example, the UE 100-1 may establish a bearer used in the UE-network relaying, based on the configuration information received together with the "ProSe UE-NW Relay Setup". The UE 100-1 can thereby start relaying early without executing the detachment processing.

In addition, in this case, processing in steps S130 and S140 can be omitted.

In addition, the UE 100-1 may determine whether to execute the UE-network relaying. If the UE 100-1 determines to execute the UE-network relaying, the UE 100-1 executes configuration based on "ProSe UE-NW Relay Setup".

In step S130, the UE 100-1 transmits a response to the "ProSe UE-NW Relay Setup" to the eNB 200. The eNB 200 receives the response.

The response may indicate whether to agree to the execution of the UE-network relaying. For example, if the execution of the UE-network relaying is agreed, after the configuration (setup) that is based on "ProSe UE-NW Relay Setup" is completed, the UE 100-1 may transmit "ProSe UE-NW Relay Setup Complete" to the eNB 200, as a response indicating that the execution of the UE-network relaying is agreed (positive response).

If the execution of the UE-network relaying is not agreed, the UE 100-1 may transmit, to the eNB 200, a response indicating that the execution of the UE-network relaying is refused (negative response). The eNB 200 that has received the negative response gives up causing the UE 100-1 to execute the UE-network relaying. This can prevent such a situation that the UE 100-1 is forced to execute the UE-network relaying.

In step S140, the eNB 200 transmits, to the UE 100-1, configuration information for establishing the bearer used in the UE-network relaying (ProSe UE-NW Relay Configuration). The UE 100-1 receives the configuration information.

Examples of the configuration information include a dedicated logical channel configuration (Logical Channel Config.) for UE-network relaying, a dedicated temporary Identifier (radio network temporary identifier (RNTI)) allocated to the UE 100-1 serving as a relay node for the UE-network relaying, and the like.

If the eNB 200 receives the response indicating that the execution of the UE-network relaying is agreed (positive response), the eNB 200 may start an operation for causing the UE 100-1 to execute the UE-network relaying. The eNB 200 may transmit configuration information (ProSe UE-NW Relay Configuration) to the UE 100-1 as the operation.

Alternatively, if the eNB 200 does not receive a response even though a predetermined period elapses from when "ProSe UE-NW Relay Setup" is transmitted, the eNB 200 may transmit "ProSe UE-NW Relay Configuration" to the UE 100-1.

Based on the configuration information, the UE 100-1 starts the operation for executing the UE-network relaying. For example, the UE 100-1 starts the execution of an operation to be described later. In addition, the operation for executing the UE-network relaying does not include the detachment processing. Thus, after receiving "ProSe UE-NW Relay Setup", the UE 100-1 can execute the UE-network relaying without executing the detachment.

In addition, if the UE 100-1 has discovered a remote UE, the UE 100-1 can start relaying of data after the configuration for executing the UE-network relaying is completed. If the UE 100-1 has not discovered a remote UE, the UE 100-1 can execute an operation to be described later.

As described above, the eNB 200 transmits "ProSe UE-NW Relay Setup" to the UE 100-1. Based on the "ProSe UE-NW Relay Setup", the UE 100-1 starts the operation for executing the UE-network relaying. The UE 100-1 can thereby execute the UE-network relaying without executing the detachment. As a result, a time until the start of the UE-network relaying can be shortened. Thus, the UE-network relaying can be effectively utilized.

(2) Discovery of Relay UE and Remote UE

Figure 10:
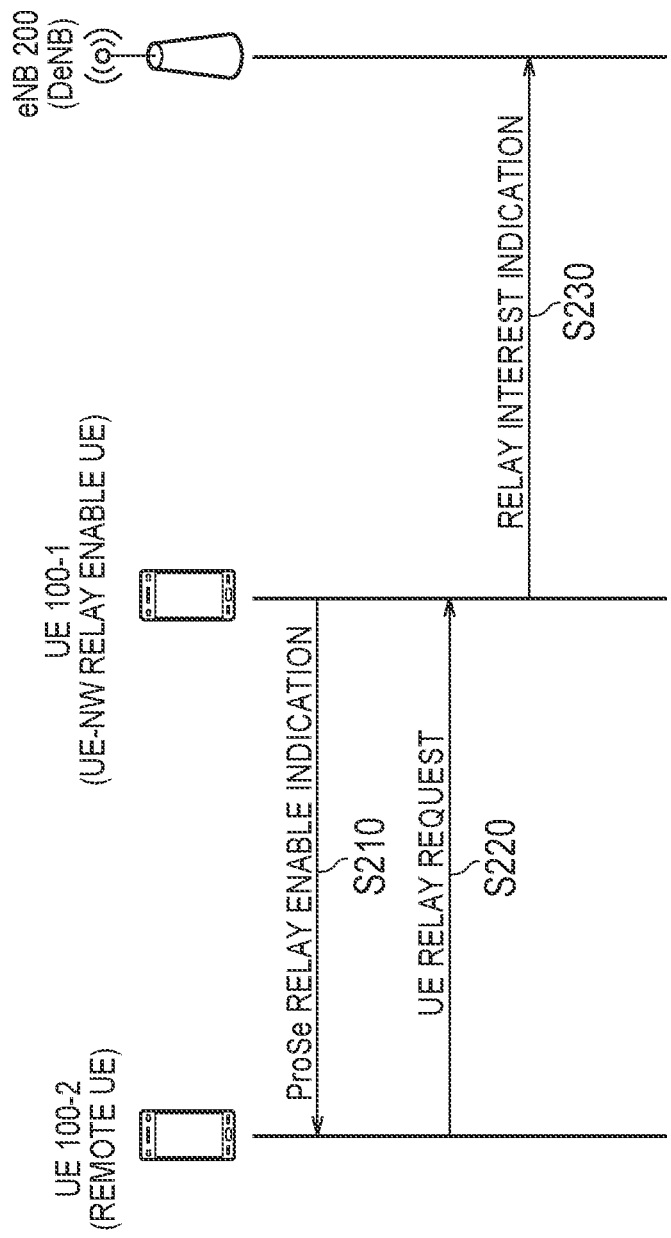
FIG. 10 is a sequence diagram for illustrating an operation (2) according to the embodiment.

Next, the discovery of a relay UE and a remote UE will be described using FIGS. 8 and 10. FIG. 10 is a sequence diagram for illustrating an operation (2) according to the embodiment.

In FIG. 8, a UE 100-2 (remote UE) is located outside the coverage of the cell (Out of coverage). The UE 100-2 is in an RRC idle state.

As illustrated in FIG. 10, in step S210, the UE 100-1 (UE-NW Relay enable UE) transmits relay information indicating that the UE-network relaying is executable (ProSe Relay enabled indication). The UE 100-2 receives the relay information.

The UE 100-1 may include the relay information in a discovery message used in the direct discovery, and transmit the discovery message. Alternatively, the UE 100-1 may include the relay information in a control signal (Sildelink Control) in the D2D ProSe, and transmit the control signal. Alternatively, the UE 100-1 may include the relay information in a synchronization signal (SLSS or MIB-SL) in the D2D ProSe. The sidelink synchronization signal (SLSS) is a radio signal used in synchronization for the D2D ProSe. The master information block-SL (MIB-SL) is a radio signal including information transmitted by a UE that transmits the synchronization signal (SLSS).

Together with the relay information, the UE 100-1 transmits an identifier of the UE 100-1 serving as a relay UE. The identifier is used by the remote UE as a transmission destination ID (Destination ID). For example, the identifier may be at least any of an IP address of the UE 100-1, the aforementioned dedicated temporary Identifier (RNTI) allocated from the eNB 200, and an identifier (ProSe Relay (UE) ID) associated with connection (packet data network (PDN) connection) established by the UE 100-1 serving as a relay UE, and used in the direct communication.

The UE 100-1 may start transmission of the relay information if transmission of a synchronization signal (SLSS) in the D2D ProSe is requested from the eNB 200. The UE 100-1 may end the transmission of the relay information if the transmission of the synchronization signal (SLSS) in the D2D ProSe is ended. The remote UE can thereby make a UE that executes the UE-network relaying and a UE synchronized by the remote UE, the same. Thus, the UE-network relaying can be effectively utilized.

During the execution of direct communication or during the execution of direct discovery, the UE 100-1 may transmit relay information. The UE 100-1 can thereby avoid transmitting relay information even if the D2D ProSe is not used. Thus, the UE 100-1 can suppress electricity consumption.

The UE 100-1 may transmit relay information only if a reception level of a radio signal (reference signal) from the eNB 200 (cell) is less than a threshold value. For example, the threshold value is a value larger than a reception level of a radio signal received from the cell if the UE 100-1 is located outside the cell coverage. In addition, the threshold value is a value smaller than a reception level of a radio signal received from the cell if the UE 100-1 is located near the center of the cell. Thus, the UE 100-1 can transmit relay information only if the UE 100-1 is located not near the center of a serving cell but near the end portion of the serving cell. The UE 100-1 can thereby deliver relay information to a broad range outside the cell coverage. Thus, the UE-network relaying can be effectively utilized.

If the UE-network relaying is not started, the UE 100-1 may transmit relay information. If the UE-network relaying is already being executed (if relaying is actually performed), the UE 100-1 may transmit relay information.

In step S220, the UE 100-2 transmits a request indicating that data is desired to be relayed using the UE-network relaying (UE Relay Request). The UE 100-1 receives the request.

If the UE 100-2 desires to transmit data to a network, the UE 100-2 can transmit the "UE Relay Request" to the UE 100-1 being a transmission source of the relay information. Alternatively, if the UE 100-2 desires to communicate with the network, the UE 100-2 can transmit the "UE Relay Request" to the UE 100-1 being a transmission source of the relay information.

The UE 100-2 may transmit, as the "UE Relay Request", a discovery message including an identifier dedicated for the "UE Relay Request". Alternatively, the UE 100-2 may transmit, as the "UE Relay Request", a direct communication message addressed to the identifier dedicated for the "UE Relay Request". In this case, the UE 100-2 may transmit a direct communication message not including data and only including control information (sidelink control).

In addition, the UE 100-2 can transmit the "UE Relay Request" to the UE 100 if, for example, the UE 100 located within the coverage of the cell is discovered, even if relay information is not received. Alternatively, the UE 100-2 may transmit the "UE Relay Request" by broadcast regardless of whether the UE 100 located within the coverage of the cell is discovered.

In addition, if the UE 100-1 is already executing the UE-network relaying, the UE 100-2 may transmit, to the UE 100-1 as the "UE Relay Request", data desired to be transmitted to the network.

If the UE 100-1 receives the "UE Relay Request", in step S230, the UE 100-1 notifies the eNB 200 that the "UE Relay Request" has been received (Relay Interest indication). The eNB 200 can thereby identify a UE that desires the execution of the UE-network relaying. The eNB 200 that has received the "Relay Interest indication" transmits, for example, the aforementioned "ProSe UE-NW Relay Setup" to the UE 100-1. Alternatively, the eNB 200 may transmit the "ProSe UE-NW Relay Setup" to another UE 100 existing in the neighborhood of the UE 100-1.

As described above, because the UE 100-1 can transmit relay information, the UE 100-2 located outside the coverage of the cell can notice that the UE 100-1 can execute the UE-network relaying. As a result, the UE-network relaying can be effectively utilized.

(3) UE-Network Relaying

Figure 11:
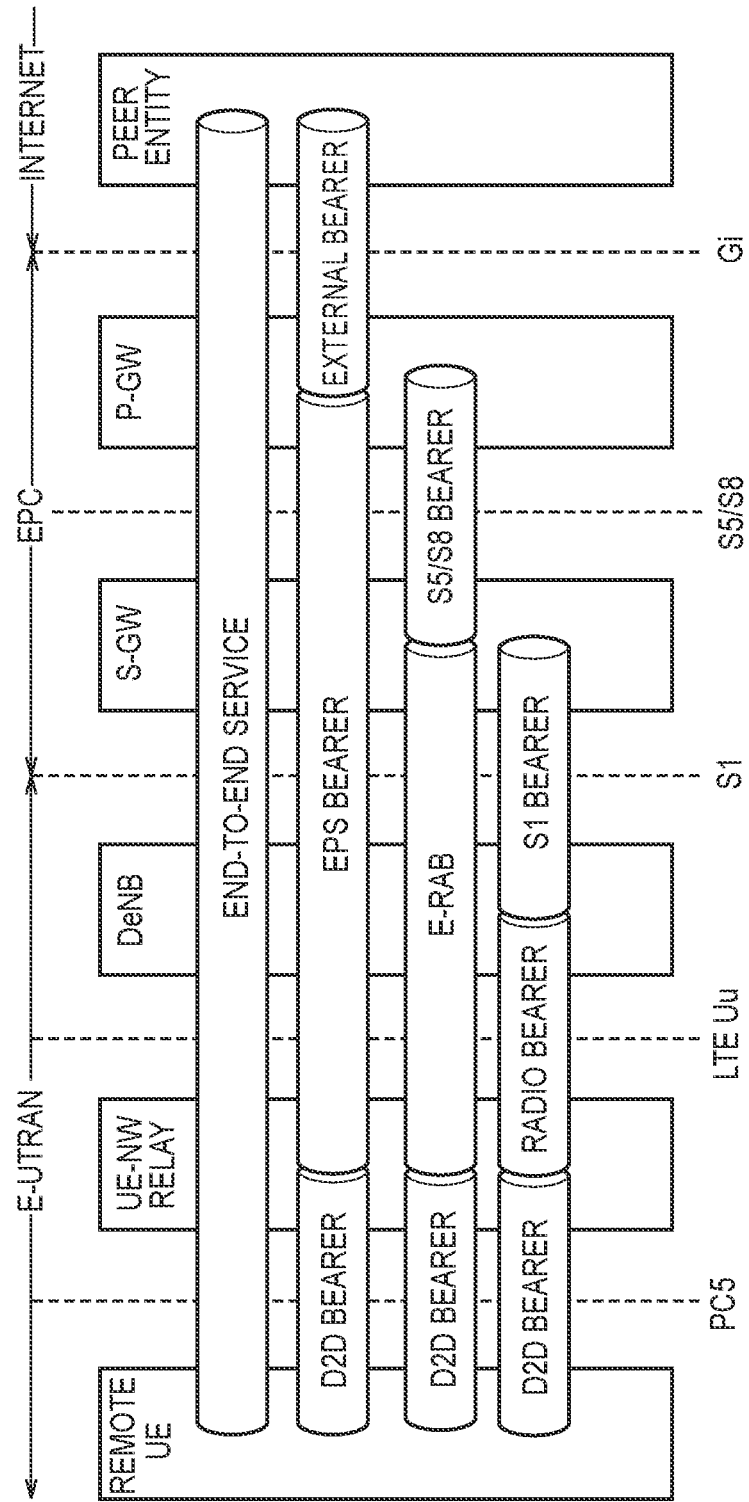
FIG. 11 is a diagram for illustrating a bearer (evolved packet system (EPS) Bearer) according to the embodiment.
Figure 12:
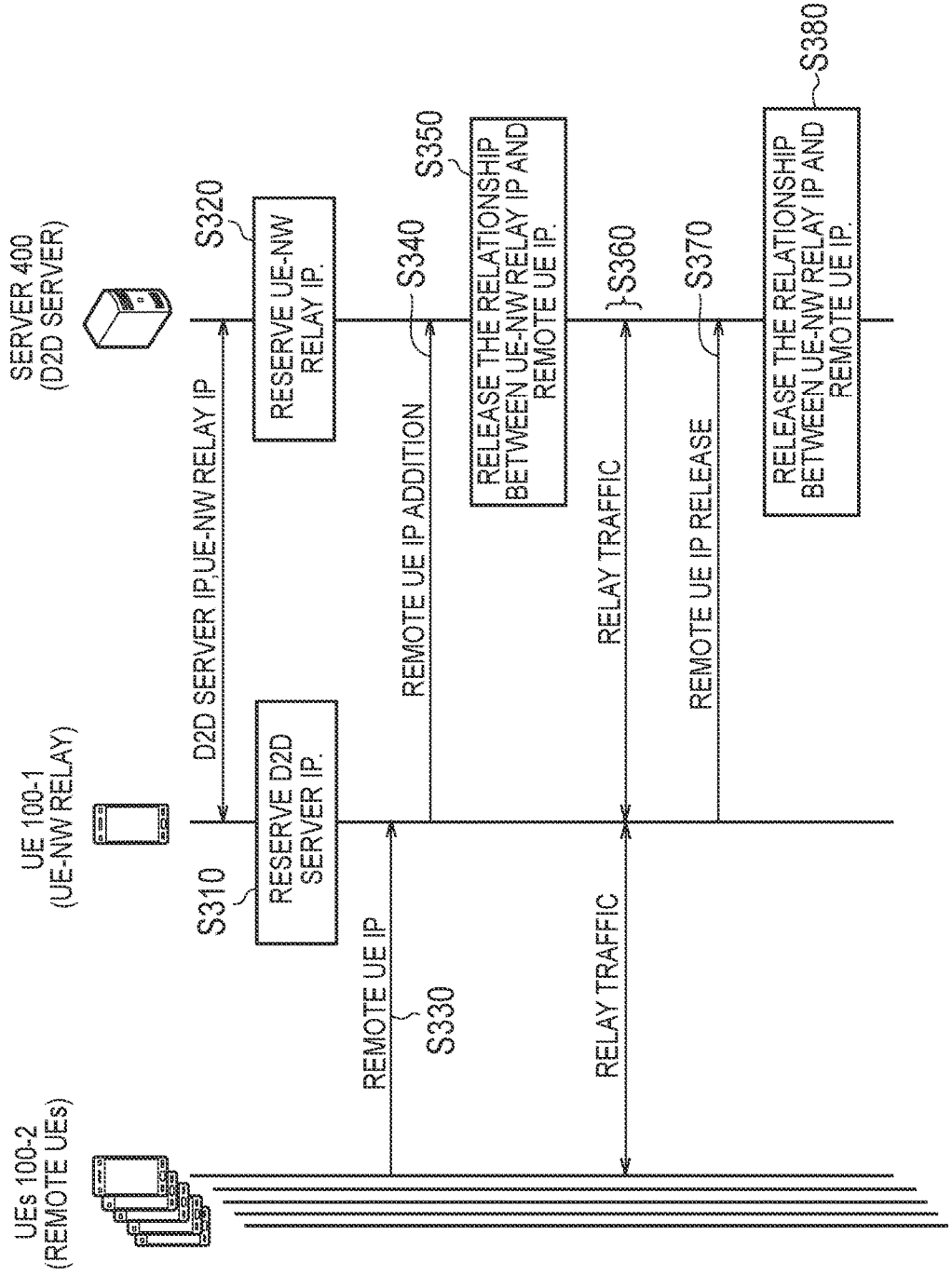
FIG. 12 is a sequence diagram for illustrating an operation (3) according to the embodiment.

Next, the UE-network relaying will be described using FIGS. 11 and 12. FIG. 11 is a diagram for illustrating a bearer (EPS Bearer) according to the embodiment. FIG. 12 is a sequence diagram for illustrating an operation (3) according to the embodiment.

In the present embodiment, as illustrated in FIG. 11, data relaying is performed using the UE-network relaying in a state in which the EPS bearer has not been established between the remote UE and the P-GW 350. The relay UE establishes an EPS bearer used in the UE-network relaying, aside from an EPS bearer of the relay UE itself. In addition, a bearer for the D2D ProSe (D2D Bearer) is established between the remote UE and the relay UE. In the UE-network relaying, data relaying is performed using the "D2D bearer" and the "EPS bearer".

In addition, the EPS bearer includes an E-UTRAN radio access bearer (E-RAB) and an S5/S8 bearer. The E-RAB is a bearer between the relay UE and a serving gateway (S-GW) 300. The S5/S8 bearer is a bearer between an S-GW 300B and the P-GW 350. The S5/S8 bearer is established on the S5/S8 interface. If the E-RAB exists, the E-RAB corresponds to the EPS bearer on a one-to-one basis. The S-GW 300 reserves correspondence relationship between the S5/S8 bearer and an S1-U bearer.

The E-RAB includes a data radio bearer (DRB/Radio Bearer) and the S1-U bearer (S1-U Bearer). The data radio bearer is a bearer between the relay UE and the eNB 200 (DeNB). The S1-U bearer is a bearer between the eNB 200 and the S-GW 300.

The S1-U bearer is established on an S1-U interface. If the data radio bearer exits, data radio bearer corresponds to the EPS bearer/E-RAB on a one-to-one basis. The eNB 200 reserves correspondence relationship between the S1-U bearer and the data radio bearer.

In the present embodiment, data transmission is performed in a state in which the "EPS bearer" is not established between the remote UE and the P-GW 350, and the remote UE does not execute attachment. In other words, location registration of the remote UE is not performed in the core network. In other words, the core network cannot identify the location of the remote UE. Thus, as illustrated in FIG. 12, the server 400 (D2D Server) that reserves the remote UE and the relay UE in association with each other appropriately transmits data of the relay UE.

As illustrated in FIG. 12, in step S310, the UE 100-1 serving as a relay UE reserves an identifier (IP address (D2D Server IP), etc.) of the server 400. The UE 100-1 receives the identifier from the server 400. Alternatively, the UE 100-1 may receive the identifier of the server 400 from the eNB 200 by "ProSe UE-NW Relay Setup" or "ProSe UE-NW Relay Configuration", for example.

In step S320, the server 400 reserves an identifier (IP address (UE-NW Relay IP), etc.) of the UE 100-1. More specifically, the server 400 reserves an identifier (IP address, etc.) of the UE 100-1 serving as a relay UE, into a relay table. In the relay table, (the identifier of) the relay UE and (the identifier of) the remote UE are associated with each other.

In addition, the server 400 receives the identifier of the UE 100-1 from the UE 100-1, and reserves the identifier into the relay table. The server 400 may receive the identifier of the UE 100-1 from the eNB 200 that has transmitted "ProSe UE-NW Relay Setup" or "ProSe UE-NW Relay Configuration".

In step S330, the UE 100-2 being a remote UE transmits an identifier (IP address (Remote UE IP)) of the UE 100-2 itself to the UE 100-1. The description will now be given assuming that the UE 100-2 is a remote UE not recognized by the UE 100-1. The UE 100-2 may transmit the identifier of the UE 100-2 itself using the aforementioned "UE Relay Request".

In step S340, the UE 100-1 transmits, to the server 400, a notice for adding the identifier of the remote UE to the relay table (Remote UE IP addition). If the UE 100-1 decides to be a relay UE of the UE 100-2, the UE 100-1 notifies the server 400 of the "Remote UE IP addition". Thus, if the UE 100-1 places a new remote UE under itself, the UE 100-1 notifies the server 400 of the "Remote UE IP addition".

The "Remote UE IP addition" indicates that the UE 100-2 is a remote UE. The "Remote UE IP addition" includes the identifier of the UE 100-2. In addition, the "Remote UE IP addition" may be the aforementioned "Relay Interest indication".

In step S350, the server 400 reserves relationship between the relay UE and the remote UE. More specifically, the server 400 reserves the identifier of the UE 100-2 into the relay table in response to the reception of the "Remote UE IP addition". More specifically, the server 400 reserves the identifier of the UE 100-2 serving as a remote UE that is included in the "Remote UE IP addition", into the relay table in association with the identifier of the UE 100-1.

In step S360, relaying of data (traffic) is executed. Here, the data relaying is executed in a state in which the EPS bearer is not established between the remote UE and the P-GW 350.

If downlink data addressed to the UE 100-2 is delivered, based on the relay table, the server 400 notifies the UE 100-1 associated with the UE 100-2, of the downlink data addressed to the UE 100-2. The UE 100-1 receives the downlink data addressed to the UE 100-2, via the EPS bearer for the UE-network relaying. The UE 100-1 relays the downlink data addressed to the UE 100-2, to the UE 100-2 via the D2D bearer. The UE 100-2 can thereby receive downlink data even in a state in which the EPS bearer is not established between the UE 100-2 and the P-GW 350, that is, even in a state in which location registration is not performed in the core network.

On the other hand, if uplink data to an external network is generated, the UE 100-2 transmits the uplink data to the UE 100-1. The UE 100-1 relays the uplink data to the server 400 via the EPS bearer for the UE-network relaying. More specifically, the UE 100-1 relays the uplink data to the server 400 through the P-GW 350.

If the UE 100-1 performs relaying of a plurality of UEs 100-2 being a plurality of remote UEs, the UE 100-1 may combine uplink data of the plurality of UEs 100-2, and relay the combined uplink data to the server 400 via one EPS bearer. The UE 100-1 may encapsulate data of the plurality of UEs 100-2, and relay the encapsulated uplink data to the server 400.

In addition, in a case in which the identifier of the UE 100-2 serving as a remote UE is not transmitted by "Remote UE IP addition", even if the UE 100-1 receives uplink data of the UE 100-2, the UE 100-1 may relay the uplink data to the server 400.

The server 400 that has received the uplink data transmits the uplink data to a transmission destination of the uplink data. If uplink data of the plurality of UEs 100-2 are combined, the server 400 separates the uplink data based on the relay table. The server 400 transmits uplink data separated for each transmission source UE 100-2, to a corresponding transmission destination.

In addition, if the server 400 receives uplink data of a new UE 100-2 not associated with the identifier of the UE 100-1 in the relay table, the server 400 reserves an identifier of the new UE 100-2 into the relay table in association with the identifier of the UE 100-1. Processing of transmitting a notice of the "Remote UE IP addition" can be thereby omitted if the UE 100-1 is performing relaying.

In addition, if the UE 100-1 is executing the UE-network relaying, the UE 100-1 executes scheduling of time and radio resources with respect to the UEs 100-2, and allocates the time and radio resources to each of the UEs 100-2.

In step S370, the UE 100-1 transmits, to the server 400, a notice for discarding the relationship between the relay UE and the remote UE from the relay table (Remote UE IP release). The "Remote UE IP release" indicates that the UE 100-2 is no longer a remote UE. The "Remote UE IP release" includes the identifier of the UE 100-2 that is no longer a remote UE.

If the remote UE is no longer placed under the UE 100-1, the UE 100-1 notifies the server 400 of the "Remote UE IP release". An operation for the UE 100-1 determining whether the remote UE is no longer placed under the UE 100-1 will be described in "(5) Location Management of Remote UE" to be described later.

In step S380, the server 400 that has received the "Remote UE IP release" releases the relationship between the UE 100-1 and the UE 100-2. More specifically, the server 400 discards association between the identifier of the UE 100-1 and the identifier of the UE 100-2 that is included in the "Remote UE IP release".

As described above, based on the relay table, the server 400 notifies the UE 100-1 of data addressed to the UE 100-2. Relaying using the UE-network relaying can be thereby executed even in a state in which the EPS bearer is not established between the remote UE and the P-GW 350. Thus, the UE-network relaying can be effectively utilized.

(4) Addition of Relay UE

Figure 13:
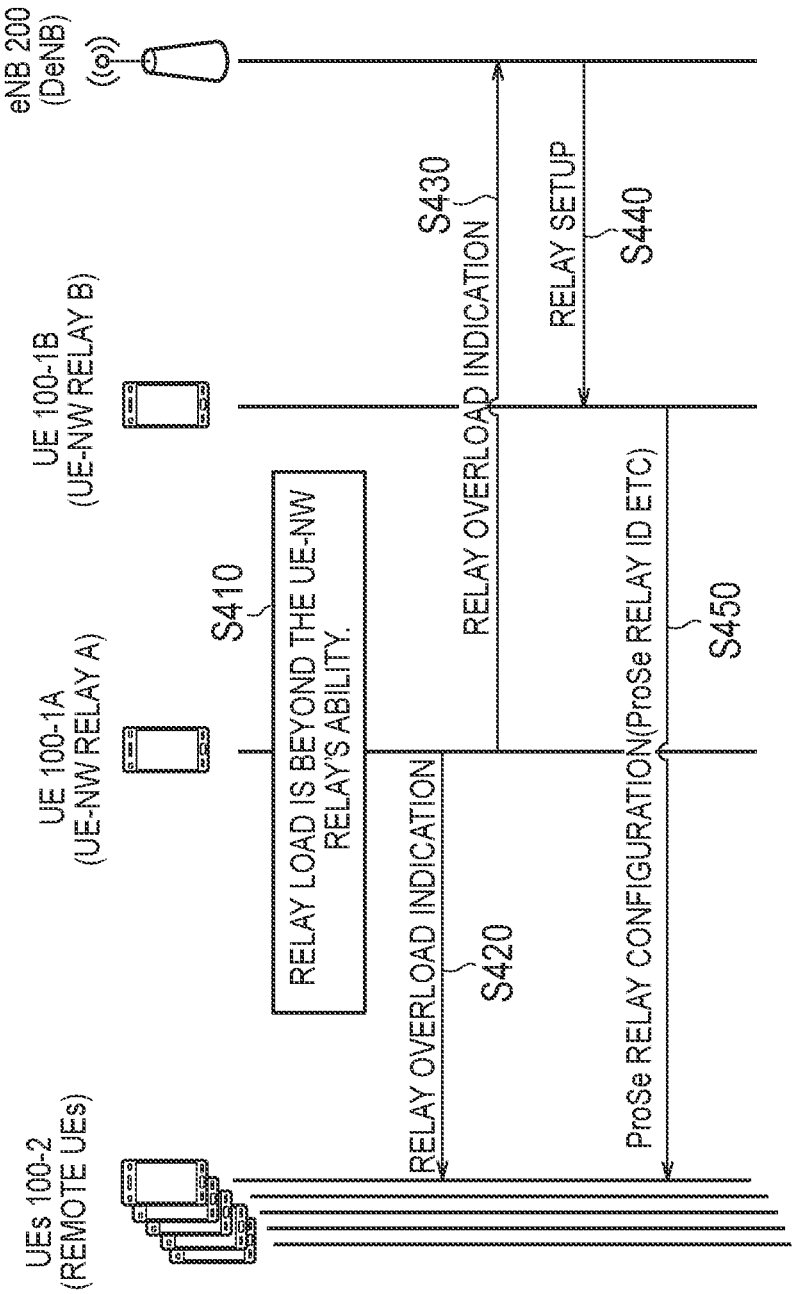
FIG. 13 is a sequence diagram for illustrating an operation (4) according to the embodiment.

Next, the addition of a relay UE will be described using FIG. 13. FIG. 13 is a sequence diagram for illustrating an operation (4) according to the embodiment.

In FIG. 13, a UE 100-1A being a relay UE is executing relaying of data of a plurality of UEs 100-2 being remote UEs.

In step S410, the UE 100-1A determines whether a load level that is based on the UE-network relaying exceeds a threshold value (a first threshold value). The determination is determination as to whether the UE 100-1A meets the limitation on processing. If the load level exceeds the first threshold value, the UE 100-1A executes processing in step S420.

Here, the load level refers to a level such as the number of remote UEs placed under the UE 100-1A, or a buffer amount of data for relaying, for example. For example, the first threshold value is a value at which the UE 100-1A cannot normally perform relaying.

In step S420, the UE 100-1A notifies the UEs 100-2 that new relaying that is based on the UE-network relaying cannot be executed (Relay overload indication). The UE 100-1A may notify that the new relaying cannot be executed, by changing a signal sequence of synchronization signals.

If the UEs 100-2 receive the "Relay overload indication", the UEs 100-2 notice that the UE 100-1A cannot execute new relaying. Thus, the UEs 100-2 may execute an operation for discovering another neighboring relay UE (direct discovery). Alternatively, the UEs 100-2 may stop transmitting uplink data to the UE 100-1A until a message indicating that new relaying is executable is received from the UE 100-1. If the load level falls below a second threshold value, the UE 100-1A can transmit a message indicating that new relaying is executable. The second threshold value is a value smaller than the first threshold value.

In step S430, the UE 100-1A notifies the server 400 of "Relay overload indication".

In step S440, in response to the reception of the "Relay overload indication", the server 400 transmits, to a UE 100-1B, a notice for causing the UE 100-1B to execute the UE-network relaying (Relay setup). The UE 100-1B is a UE to which the aforementioned configuration for executing the UE-network relaying is performed.

Alternatively, the server 400 may notify the UE 100-1B of "Relay setup" for causing the UE 100-1B to execute the operation in the aforementioned "configuration of the relay UE". In response to the reception of "Relay setup", the UE 100-1B may transmit the aforementioned "Relay Interest indication" to the eNB 200.

In step S450, the UE 100-1B transmits, to the UE 100-2, "ProSe Relay configuration" being a configuration message of the UE-network relaying. The "ProSe Relay configuration" may be the aforementioned relay information (ProSe Relay enabled indication).

If the UE 100-2 receives the "ProSe Relay configuration" from the UE 100-1B, the UE 100-2 can restart relaying using the UE 100-1B as a relay UE. The UE 100-2 may transmit "UE Relay Request" to the UE 100-1B.

As described above, the UE 100-1A can notify the UE 100-2 and/or the server 400 of "Relay overload indication". This can suppress a decrease in processing capacity of the UE 100-1A that is caused by an increase in load processing of the UE 100-1A.

In addition, in response to the reception of "Relay overload indication", the server 400 notifies the UE 100-1B of "Relay setup". The UE 100-1B thereby starts the execution of UE-network relaying. Thus, the UE-network relaying can be effectively utilized.

In addition, the UE 100-1A may notify the server 400 of a message indicating that new relaying is executable. The server 400 that has received the message may notify the UE 100-1B of a message instructing an end of the UE-network relaying.

(5) Location Management of Remote UE

Figure 14:
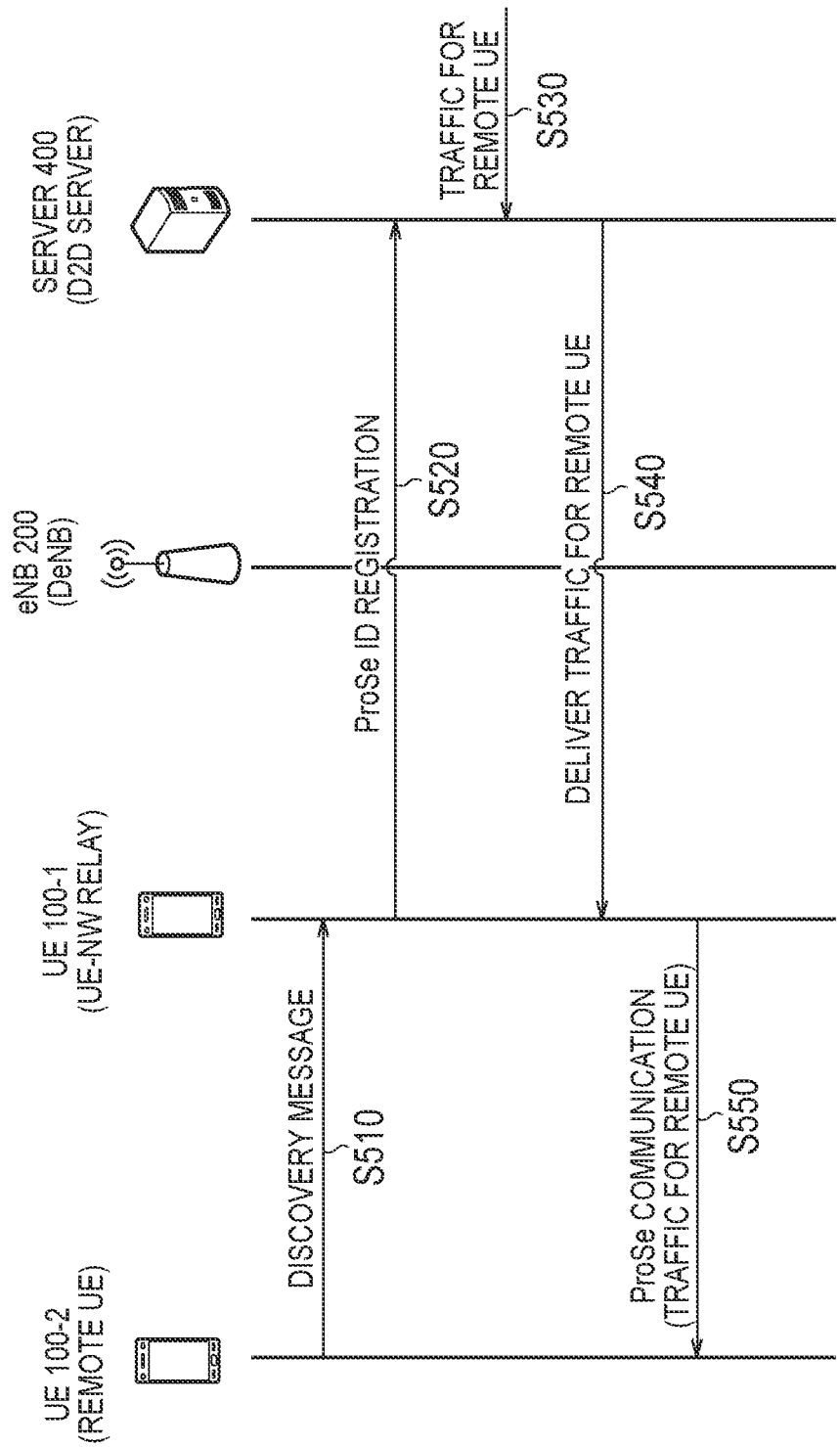
FIG. 14 is a sequence diagram for illustrating an operation (5) according to the embodiment.
Figure 15:
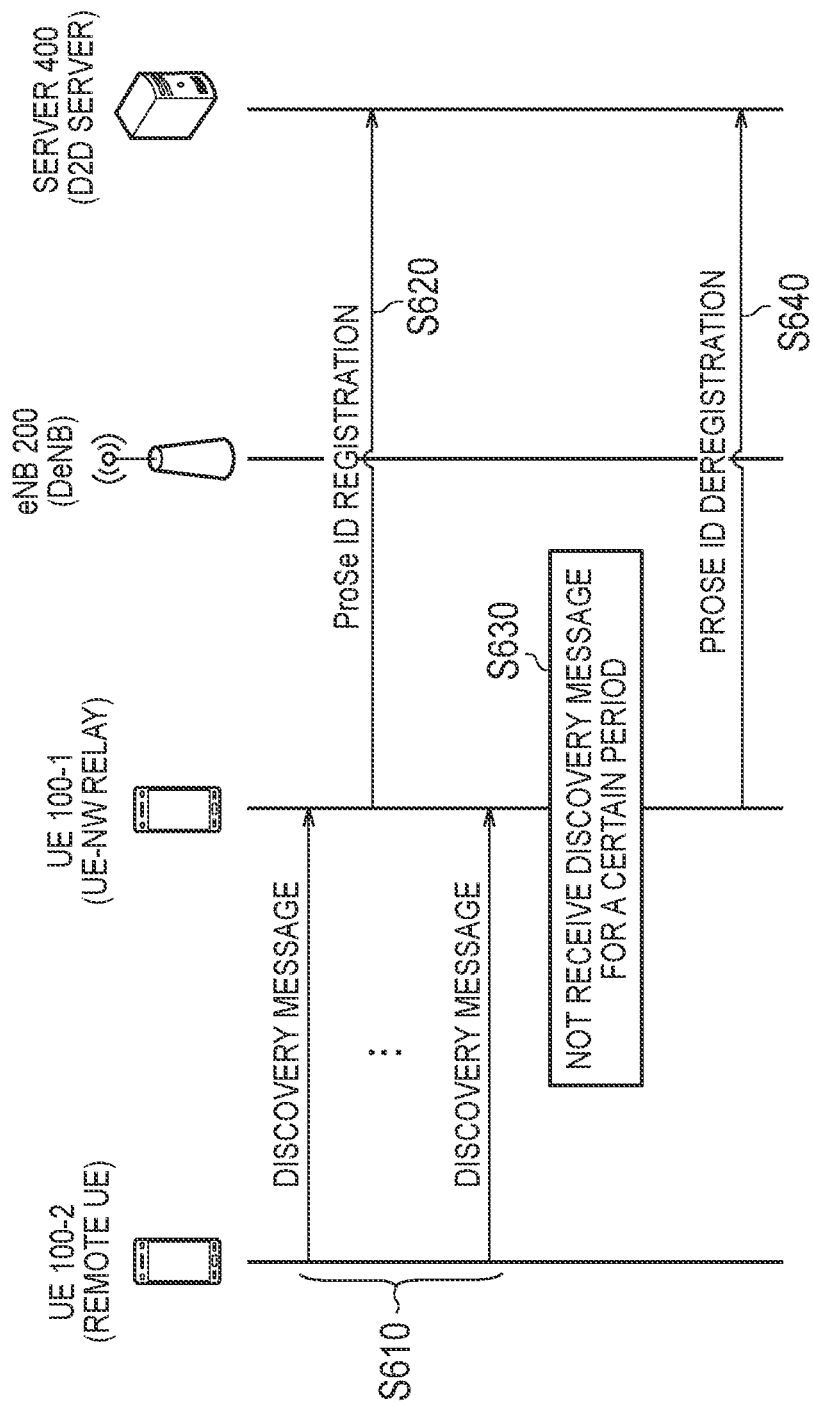
FIG. 15 is a sequence diagram for illustrating an operation (6) according to the embodiment.

Next, the location management of the remote UE will be described using FIGS. 14 and 15. FIG. 14 is a sequence diagram for illustrating an operation (5) according to the embodiment. FIG. 15 is a sequence diagram for illustrating an operation (6) according to the embodiment.

As mentioned above, if data relaying is executed in a state in which the EPS bearer is not established between the remote UE and the P-GW 350, location registration of the remote UE is not performed in the core network. Thus, because the core network cannot appropriately identify the location of the remote UE, a service terminated at the remote UE (UE terminated service) cannot be transmitted from the network to the remote UE. Thus, the server 400 can appropriately transmit "UE terminated service" to the remote UE by managing the location of the remote UE.

As illustrated in FIG. 14, in step S510, the UE 100-2 (remote UE) transmits a discovery signal to the UE 100-1 (relay UE). The discovery signal includes an identifier (e.g., ProSe ID) of the UE 100-2.

In step S520, in response to the reception of the discovery signal, the UE 100-1 notifies the server 400 of a message (ProSe ID registration) for registering the location of the UE 100-2. The "ProSe ID registration" may be a message indicating that the UE 100-2 is a remote UE. The UE 100-1 may notify the server 400 of "Relay Interest indication" or "Relay UE IP addition" as "ProSe ID registration".

The server 400 registers the location of the UE 100-2. More specifically, the server 400 reserves the UE 100-1 and the UE 100-2 in association with each other. The server 400 may register the location of the UE 100-2 by reserving the identifier of the UE 100-1 serving as a relay UE and the identifier of the UE 100-2 serving as a remote UE, into the relay table in association with each other. Alternatively, the server 400 may hold a location management table aside from the relay table, and reserve (the identifier of) the UE 100-1 and (the identifier of) the UE 100-2 into the location management table in association with each other.

In step S530, the server 400 receives downlink data (traffic) addressed to the UE 100-2. In step S540, the server 400 notifies the UE 100-1 of the downlink data based on the relay table (or the location management table). In step S550, the UE 100-1 transmits, to the UE 100-2, the downlink data addressed to the UE 100-2. In addition, in steps S530 and S540, data is relayed similarly to step S360.

Next, methods will be described for managing the location of the remote UE. The following methods can be appropriately combined.

(A) First Method

In FIG. 15, in step S610, the UE 100-2 periodically transmits a discovery message to the UE 100-1 being a relay UE. During the execution of UE-network relaying, the UE 100-2 continues to periodically transmit a discovery message. The UE 100-2 may transmit a discovery message at a second transmission cycle longer than a first transmission cycle for discovering a neighboring UE, which is normal use application. The UE 100-2 can thereby suppress electricity consumption.

Step S620 corresponds to step S520. If the UE 100-1 once notifies the server 400 of "ProSe ID registration", the UE 100-1 can omit the notice of "ProSe ID registration" even if a discovery message is received from the UE 100-2 after that. The UE 100-1 may transmit a notice "ProSe ID registration" each time the discovery message is received from the UE 100-2.

In step S630, the UE 100-1 determines that a discovery message is not received from the UE 100-2 for a certain period. The UE 100-1 may hold a timer that starts each time a discovery message is received. The timer expires if the certain period elapses. If the timer expires, the UE 100-1 determines that a discovery message is not received from the UE 100-2 for the certain period.

Here, the timer may be a timer that expires if a time longer than the first transmission cycle and shorter than the second transmission cycle elapses, and may be a timer that expires if a time longer than the second transmission cycle elapses.

If the UE 100-1 determines that a discovery message is not received from the UE 100-2 for the certain period, the UE 100-1 executes processing in step S640.

If the UE 100-1 does not receive a discovery message from the UE 100-2 for the certain period, in step S640, the UE 100-1 notifies the server 400 of a message (ProSe ID deregistration) indicating that the UE 100-2 is no longer a remote UE. The "ProSe ID deregistration" is a message for removing the registration of the location of the UE 100. The "ProSe ID deregistration" may be the aforementioned "Remote UE IP release".

If the server 400 receives the "ProSe ID deregistration", the server 400 ends the location management of the UE 100-2. In other words, the server 400 discards association between the identifier of the UE 100-1 and the identifier of the UE 100-2.

As described above, if the UE 100-1 does not receive a discovery message from the UE 100-2 for a certain period, the UE 100-1 notifies the server 400 of "ProSe ID deregistration". The UE 100-1 can thereby notice that the UE 100-2 does not exist in the vicinity or the UE 100-2 no longer desires relaying, without executing an operation from the UE 100-1 itself. Thus, based on the notice from the UE 100-1 that identifies the location of the UE 100-2, the server 400 can appropriately manage the location of the UE 100-2.

(B) Second Method

In the second method, the UE 100-2 does not periodically transmit a discovery message. In contrast, if the UE 100-1 serving as a relay UE cannot relay downlink data addressed to the UE 100-2, to the UE 100-2, the UE 100-1 notifies the server 400 of "ProSe ID deregistration". For example, if the UE 100-1 does not receive delivery confirmation of the downlink data from the UE 100-2 after transmitting the downlink data to the UE 100-2, the UE 100-1 notifies the server 400 of "ProSe ID deregistration". The UE 100-2 can thereby avoid periodically transmitting a discovery message. Thus, electricity consumption can be suppressed.

(C) Third Method

In the third method, the server 400 updates the location of the UE 100-2 based on "ProSe ID registration" from another UE 100.

In a state in which the identifier of the UE 100-1 and the identifier of the UE 100-2 are associated with each other in the relay table (or the location management table), the server 400 receives, from another UE 100-3, "ProSe ID registration" indicating that the UE 100-2 is a relay UE.

The server 400 reserves an identifier of the UE 100-3 and the identifier of the UE 100-2 into the relay table (or the location management table) in association with each other. On the other hand, the server 400 discards the association between the identifier of the UE 100-1 and the identifier of the UE 100-2. The server 400 can thereby appropriately manage the location of the UE 100-2 if, for example, the UE 100-1 does not notice the movement of the UE 100-2.

Modified Example

Figure 16:
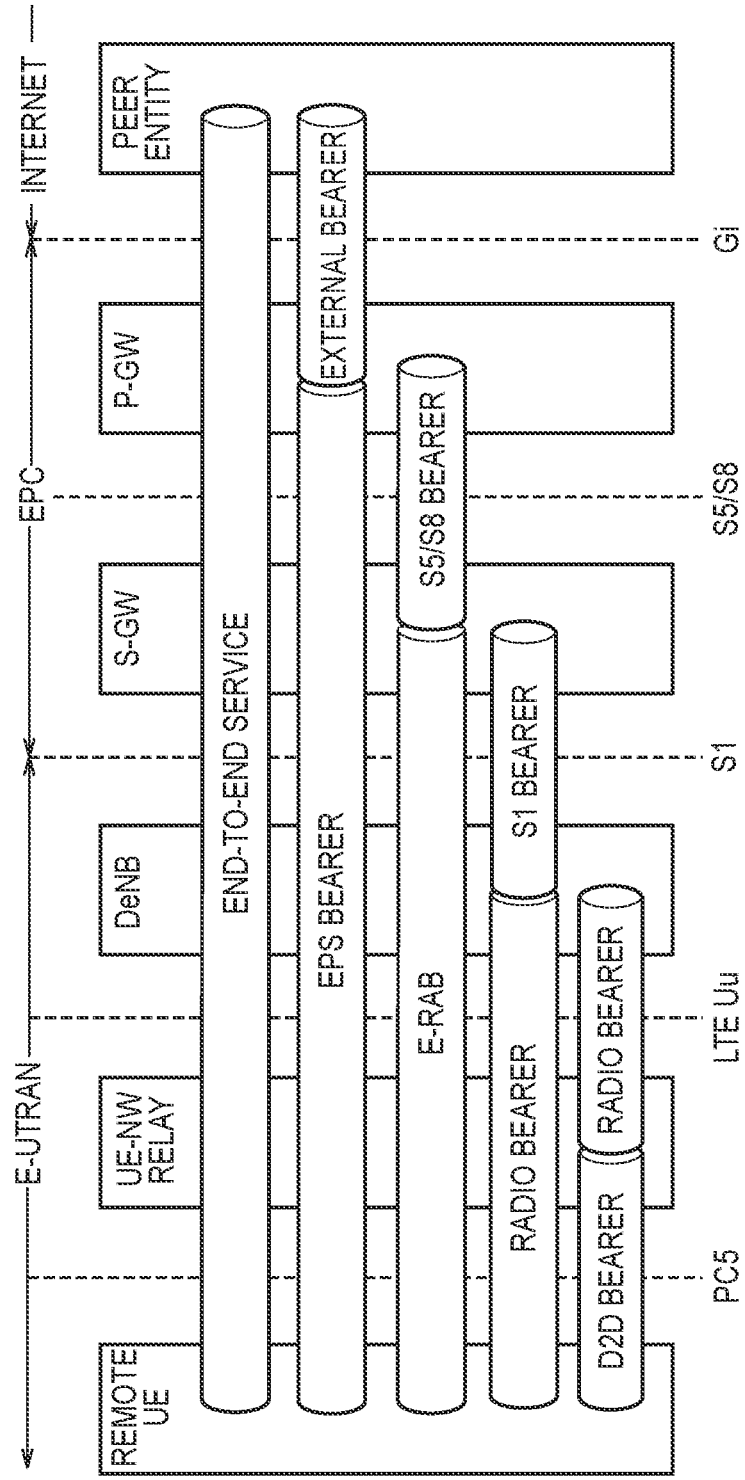
FIG. 16 is a diagram for illustrating a bearer (EPS Bearer) according to a modified example according to the embodiment.

A modified example according to the present embodiment will be described below using FIG. 16. FIG. 16 is a diagram for illustrating a bearer (EPS Bearer) according to the modified example according to the embodiment.

In the aforementioned embodiment, data relaying is performed using the UE-network relaying in a state in which the EPS bearer has not been established between the remote UE and the P-GW 350. In this modified example, as illustrated in FIG. 16, data relaying is performed using the UE-network relaying in a state in which the EPS bearer has been established between the remote UE and the P-GW 350. Thus, in the UE-network relaying, data relaying is performed using the "EPS bearer".

In addition, as illustrated in FIG. 16, a radio bearer (Radio Bearer) constituting the E-RAB is established between the remote UE and the eNB 200 (DeNB). The radio bearer includes a D2D bearer (D2D Bearer) and a radio bearer. The D2D bearer is a bearer between the remote UE and the relay UE. The radio bearer is a bearer between the relay UE and the eNB 200.

In this modified example, the relay UE connects to the eNB 200 in place of the remote UE. In addition, the relay UE executes the attachment to the core network (an evolved packet core (EPC 20)) in place of the remote UE. The location registration of the remote UE is thereby performed in the core network. The core network can thereby recognize the eNB 200 located near the remote UE. Thus, as mentioned above, even if the server 400 does not exist, a service terminated at the remote UE (UE terminated service) can be transmitted to the remote UE.

Nevertheless, because the EPS bearer is established between the remote UE and the P-GW 350, the relay UE is assumed to receive the configuration of the remote UE (RNTI (e.g., Cell RNTI (C-RNTI)), Discontinuous Reception (DRX) configuration) although the relay UE is one node. In this case, the relay UE communicates with the network based on the configuration of the remote UE. Nevertheless, if a UE is a relay UE for a plurality of remote UEs, complexity of communication with the network may increase.

Thus, the following methods can be executed for solving the aforementioned problem.

More specifically, if the UE-network relaying is executed in a state in which the EPS bearer is established between the remote UE and the P-GW 350, the eNB 200 commonalizes information to be configured in a plurality of remote UEs to which data is relayed from the same relay UE. For example, the eNB 200 can make all the configurations related to the EPS bearer, the same, or the eNB 200 may make all the configurations related to the radio bearer, the same.

If the eNB 200 receives "Remote UE IP addition" from the relay UE, the eNB 200 configures the same information as information already configured in the remote UE placed under the relay UE, in an added remote UE. Alternatively, if the number of remote UEs placed under the relay UE exceeds a threshold value, the eNB 200 may commonalize information to be configured in remote UEs added after the exceedance of the threshold value. Thus, the eNB 200 may commonalize the configurations of all the remote UEs placed under one relay UE. The eNB 200 may commonalize the configurations of part of the remote UEs placed under one relay UE.

The eNB 200 notifies the relay UE of configuration information configured in common. The relay UE receives the configuration information configured in common. Based on the configuration information, the relay UE executes an operation for a plurality of remote UEs. The relay UE can thereby reduce the number of operations executed in place of a plurality of remote UEs, as compared with a case in which the operation is executed based on configuration information pieces individually configured for a plurality of remote UEs.

For example, the eNB 200 allocates (configures) a common temporary identifier (RNTI) to a plurality of remote UEs. The eNB 200 transmits the common temporary identifier to the relay UE. Based on the common temporary identifier received from the eNB 200, the relay UE executes PDCCH decoding processing for acquiring DL-UL allocation information (Downlink Control Information (DCI)) on the Uu interface. The relay UE can thereby acquire the DL-UL allocation information of a plurality of remote UEs through one PDCCH decoding processing. If a temporary identifier is allocated to each of a plurality of remote UEs, the relay UE needs to execute the PDCCH decoding processing the same times as the number of temporary identifiers allocated to the remote UEs. Thus, by configuring a common temporary identifier to a plurality of remote UEs, the relay UE can reduce the number of times the relay UE executes the PDCCH decoding processing in place of the plurality of remote UEs.

In addition, the eNB 200 configures common DRX to a plurality of remote UEs. The eNB 200 notifies the relay UE of the common DRX configuration. Based on the common DRX configuration, the relay UE executes monitoring of control information (PDCCH) in place of the remote UEs. If the common DRX configuration is performed for a plurality of remote UEs, the relay UE can avoid frequently performing monitoring of control information from the eNB 200 for the plurality of remote UEs.

Other Embodiments

In the aforementioned embodiment, the server 400 is provided in an external network. Nevertheless, the location of the server 400 is not limited to this. The server 400 may be included in the EPC 20.

In the aforementioned embodiment, if the UE 100-1 serving as a relay UE desires to end the UE-network relaying, the UE 100-1 can notify the UE 100-2 serving as a remote UE and/or the server 400 of a message indicating that the UE-network relaying is to be ended. The UE 100-2 can thereby early start an operation for discovering another relay UE. In addition, the server 400 can early notify another UE located within the coverage of the cell, of "Relay setup".

In the aforementioned embodiment, if the UE 100-1 in the RRC idle state executes RRC connection establishment (RRC Connection Establishment) for executing the UE-network relaying, the UE 100-1 may notify the eNB 200 of a message (e.g., "Relay Interest indication", etc.) indicating that the UE-network relaying is to be executed. For example, a request for establishing the RRC connection (RRCConnectionRequest) may be included in "Relay Interest indication".

In the aforementioned modified example, an operation of the embodiment (excluding "(5) Location Management of Remote UE") may be appropriately executed.

In the above-described embodiment, an LTE system has been described as an example of a mobile communication system. The mobile communication system, however, is not limited to the LTE system. The present disclosure may be applied to a system other than the LTE system.

Additional Statement (A) Discussion (A1) Design of Radio Bearer for ProSe UE-to-Network Relay Direct Communication over PC5 reference point is connectionless, i.e., there is no signalling for one-to-many Direct Communication. Therefore, it is assumed there's no RRC CONNECTION between Remote UE and Prose UE-to-Network Relay entity.

Observation 1: There is no RRC CONNECTION between Remote UE and UE-to-Network Relay entity.

Figure 17:
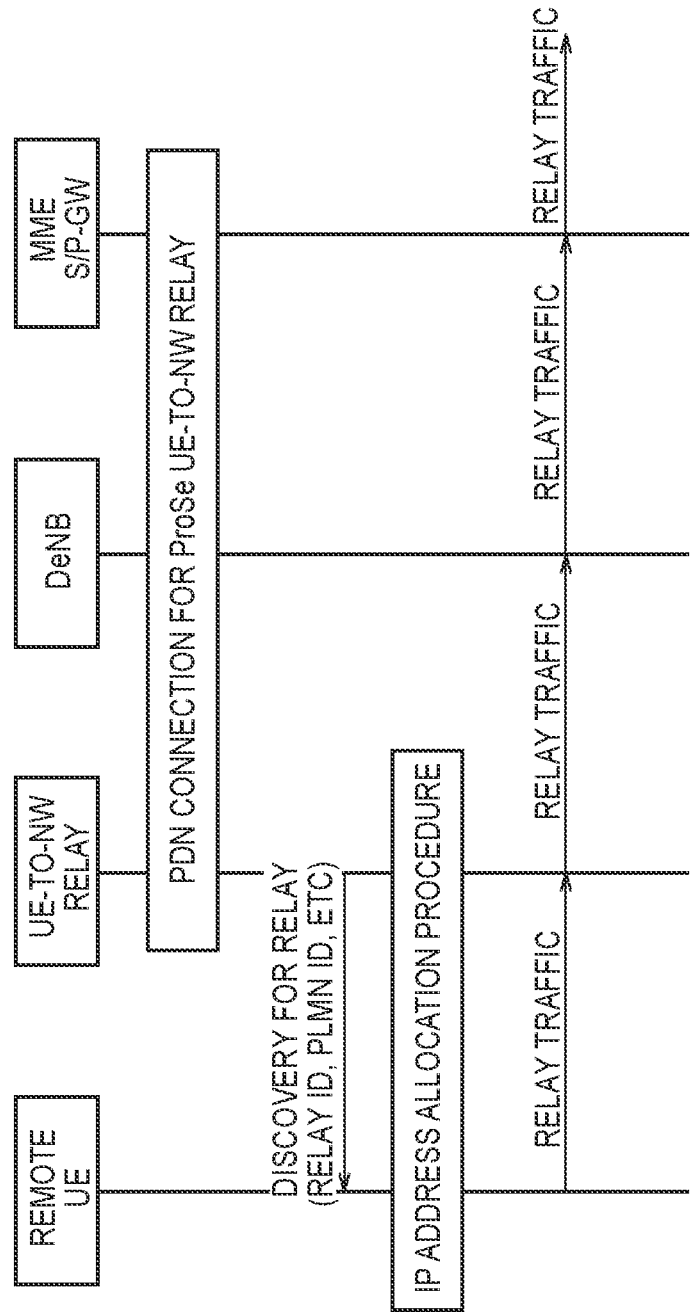
FIG. 17 is a sequence diagram for illustrating a UE-to-Network relaying procedure.

To provide the PDN connection to the Remote UE(s), the UE-to-Network Relay entity announces the discovery message consisting of ProSe Relay (UE) ID, PLMN ID, ProSe Application Relay Code and so on. The Remote UE discovers the UE-to-Network Relay entity in proximity and uses the L2 ID of the UE-to-Network Relay for IP address allocation and transfer of user traffic for ProSe UE-to-Network Relay operation. And then Remote UE transmits/receives the relay traffic to/from the peer entity in the network coverage via ProSe UE-to-Network Relay entity (FIG. 17).

Observation 2: Layer 2 ID of UE-to-Network Relay entity is associated with a PDN connection by means of Discovery.

(A1.1) Limitation in Rel-12 One-to-Many Direct Communication

Figure 18:
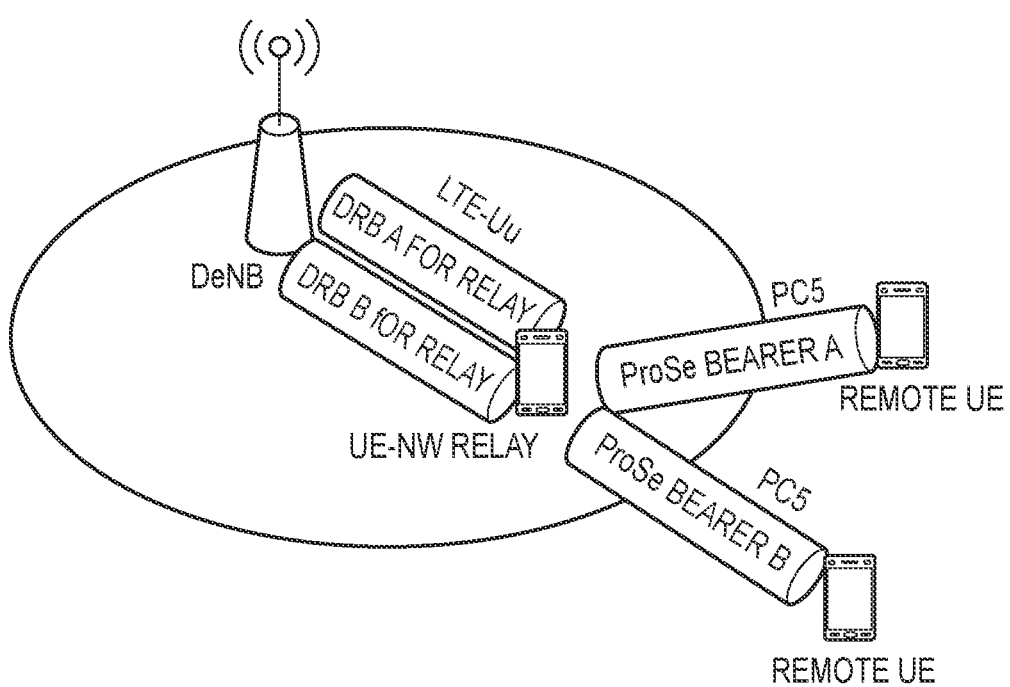
FIG. 18 is a diagram for illustrating mapping (ALT.1) of data radio bearers (DRBs) of a UE-to-Network relaying entity with respect to ProSe bearers.

The mapping of dedicated radio bearers (Dedicated Radio Bearers: DRBs) of UE-to-Network Relay entity to ProSe Bearers has two alternatives;

ALT.1: Each DRB is associated with one ProSe Bearer (FIG. 18).

Figure 19:
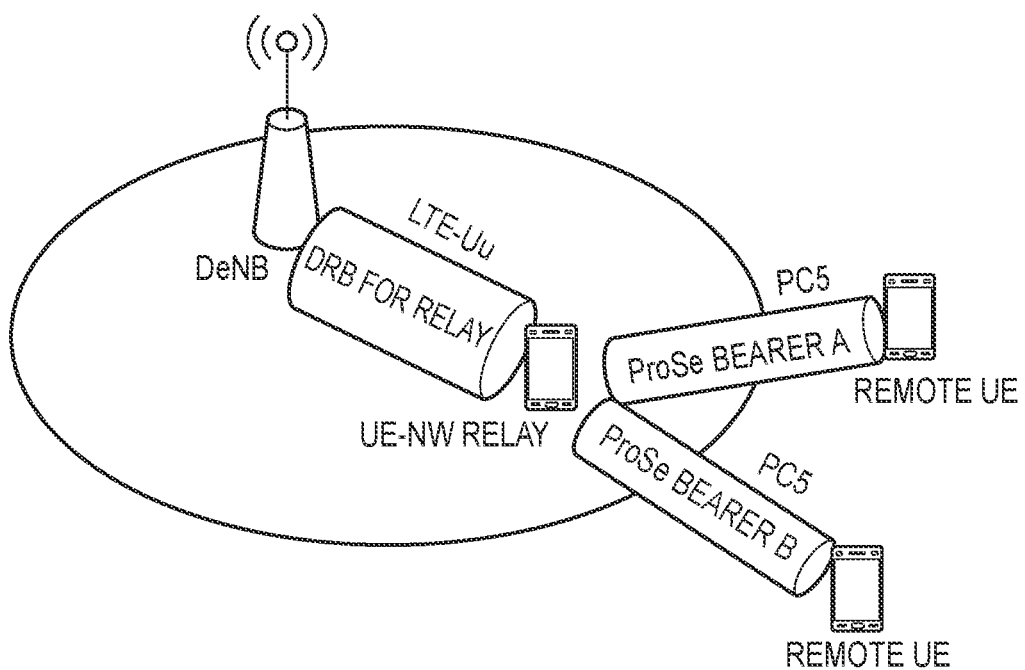
FIG. 19 is a diagram for illustrating mapping (ALT.2) of a DRB of a UE-to-Network relaying entity with respect to ProSe bearers.

ALT.2: The DRB is associated with multiple ProSe Bearers (FIG. 19).

Regarding the number of the Remote UEs served (i.e. provided with service) by the UE-to-Network Relay entity, if ALT.1 is supported, the maximum number of the Remote UEs served by the UE-to-Network Relay entity would be limited by the maximum number of DRBs, i.e. 8. Additionally, according to the current specification, if ProSe UE in RRC_CONNECTED becomes interested in Direct Communication transmission, the ProSe UE transmits the SidelinkUEInformation message including the list of destination IDs. It is assumed the UE-to-Network Relay entity will be in RRC_CONNECTED and also become interest in Direct Communication transmission if the UE-to-Network Relay entity serves the Remote UE. So the UE-to-Network Relay entity may also transmits the SidelinkUEInformation message based on the current procedure. In this case, the maximum number of the Remote UEs served by the UE-to-Network Relay entity would be limited by the current maximum number of the destinations maxSL-Dest-r12, i.e. 16. Therefore, for either alternative, we may need to consider the extension for the aspects of the number of the Remote UE served by the UE-to-Network Relay entity.

Proposal 1: It should take into account the limitations of current specification, if one-to-many Direct Communication is reused.

(A1.2) QoS Aspects

Regarding the QoS control, if ALT.1 is supported, QoS control for each Remote UE's relay traffic can follow the existing mechanism. On the other hands, if ALT.2 is supported, QoS control for each Remote UE's relay traffic cannot follow the existing mechanism, so we may need to extend the existing mechanism, e.g. DeNB performs the QoS control for the radio bearer for UE-to-Network Relay in consideration of the number of the Remote UE served by UE-to-Network Relay entity and the existing mechanism.

Proposal 2: If ALT.1 is supported, QoS control for each Remote UE's relay traffic can follow the existing mechanism.

Proposal 3: If ALT.1 is supported, QoS Control mechanism should be extended for ProSe UE-to-Network Relay mechanism.

In consideration of above QoS control aspects, for either alternative of radio bearer design, UE-to-Network Relay entity should indicate the change of the condition of served Remote UEs to DeNB. The existing indication for direct communication transmission request, i.e. SidelinkUEInformation message may be reused. Additionally, the Remote UE may move within the network's coverage, the coverage of the other UE-to-Network Relay entity or completely outside network coverage. So UE-to-Network Relay entity should notice the absence of served Remote UE and to report the actual condition of served Remote UEs to the DeNB.

Proposal 4: UE-to-Network Relay entity should indicate to DeNB the change of the condition of served Remote UEs to perform the suitable QoS control.

Proposal 5: It should introduce the way for UE-to-Network Relay entity to know the absent of served Remote UE to make efficient use of radio resource.

Depending on the agreed alternative, the radio bearer design for UE-to-Network Relay should take into account of the number of served Remote UEs (for ALT. 1) and aspects of QoS control (for ALT. 2).

Proposal 6: The radio bearer design for UE-to-Network Relay entity should take into account of the number of served Remote UEs (for ALT. 1) and aspects of QoS control (for ALT. 2).

(A2) Establishment of ProSe UE-to-Network Relay

Figure 20:
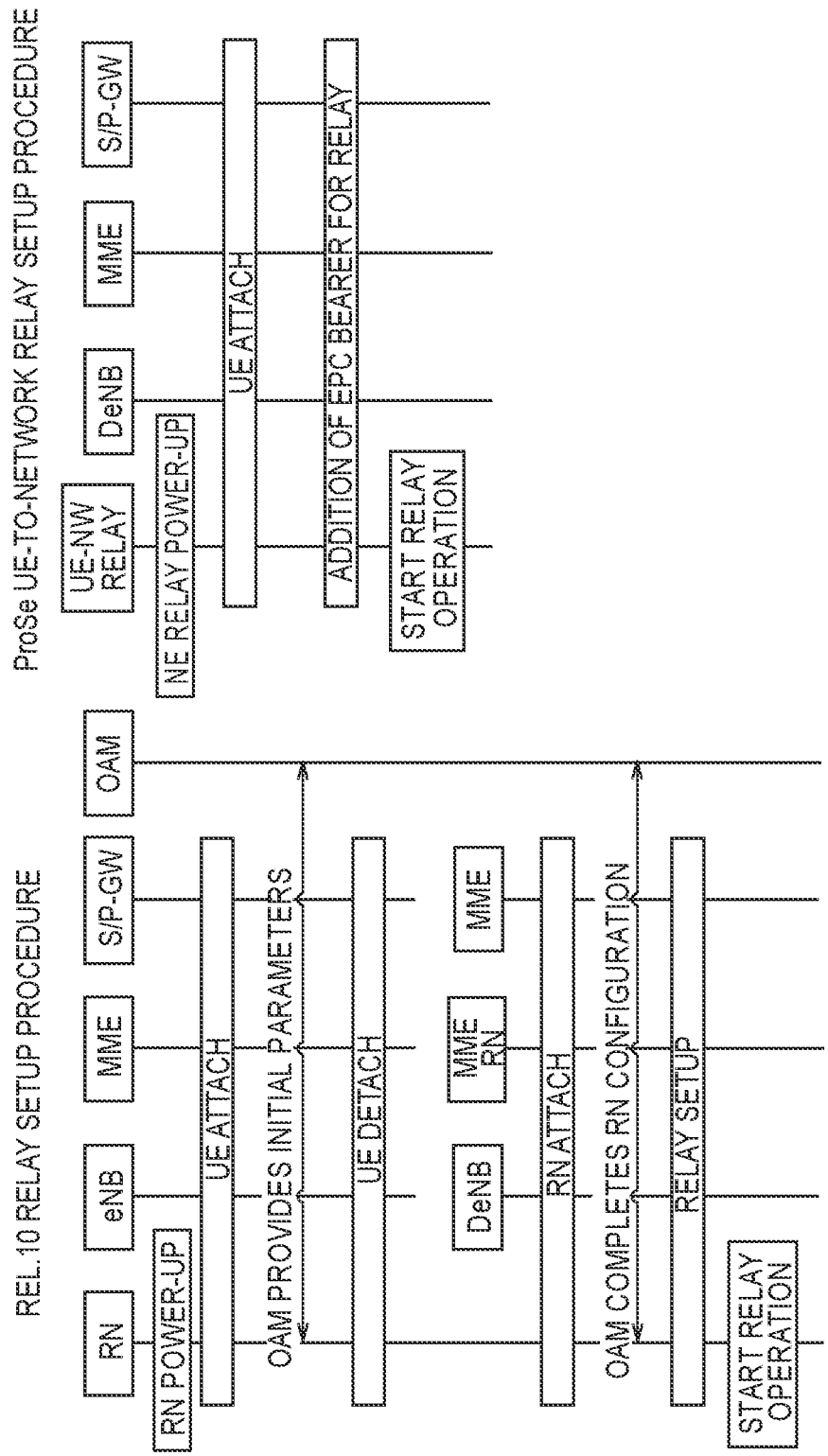
FIG. 20 is a diagram for illustrating a relay setup procedure.

Regarding the establishment procedure of Rel-10 Relay, the RN attaches to the E-UTRAN/EPC as a UE to retrieve the initial configuration parameter from RN OAM, and then the RN detaches as a UE, and finally the RN attaches as the RN, establishes Un interface and initiates the Relay operation. On the other hands, for the ProSe UE-to-Network Relay, the connection between UE-to-Network Relay entity and DeNB is established over Uu interface, therefore, it is not necessary to apply current Relay establishment procedure to ProSe UE-to-Network Relay entity. As for the establishment procedure of ProSe UE-to-Network Relay, the DeNB can add the radio bearer of Relay operation to UE-to-Network Relay (FIG. 20 (Right figure)).

Proposal 7: The establishment of ProSe UE-to-Network Relay should be initiated by adding the DRB of ProSe UE-to-Network Relay operation to UE-to-Network Relay entity.

If the extension of the cellular coverage for the disaster case is assumed for the public safety use case, it may be desirable for normal public safety UEs to provide the functionality of Relay in addition to dedicated relay nodes. Therefore, as necessary, the eNB should establish the DRB for ProSe UE-to-Network Relay operation to UE-to-Network Relay enabled UEs.

Additionally, it may be assumed the Remote UE requests Relay operation to UE-to-Network Relay enabled UEs not yet operating as the ProSe UE-to-Network Relay. In this case, UE-to-Network Relay enabled UE should indicate to the eNB the request to serve as the ProSe UE-to-Network Relay based on the initial request from the Remote UE. Then the eNB may initiate the ProSe UE-to-Network Relay operation based on this indication (FIG. 21).

Specifically, as shown in FIG. 21, firstly, synchronization is established between the remote UE and the UE-to-network Relay enabled UE. Secondly, the remote UE transmits a relay request to the UE-to-network Relay enabled UE. The UE-to-network Relay enabled UE receives the relay request. Thirdly, the UE-to-Network Relay enabled UE indicates the request of relay to the eNB. Fourthly, the DeNB transmits the ProSe UE-to-Network relay setup information to the UE-to-network Relay enabled UE. The ProSe UE-to-Network relay setup information is information for adding a radio bearer for the relay. Fifthly, the UE-to-network Relay enabled UE (Relay UE) transmits a discovery message for the relay to the remote UE. Sixthly, the remote UE transmits relay traffic to the UE-to-network Relay enabled UE (Relay UE). Seventhly, the UE-to-Network Relay enabled UE (Relay UE) transmits the relay traffic from the remote UE to the DeNB.

Proposal 8: ProSe UE should indicate to the eNB the request to serve as the ProSe UE-to-Network Relay based on the request from the remote UE.

(A3) Service Continuity for ProSe UE-to-Network Relay

During the ProSe UE-to-Network Relay operation, there are three service continuity scenarios as following.

Scenario 1: ProSe UE-to-Network Relay Coverage→Network Coverage

When the Remote UE moves within the network's coverage, i.e. S-criteria is fulfilled, the Remote UE should prioritize the network's coverage and then establish the DRB instead of the ProSe bearer. It is for further study whether the no longer necessary ProSe bearer should be released explicitly.

Scenario 2: Network Coverage→ProSe UE-to-Network Relay Coverage

In this scenario, the in-coverage UE may need to prepare the initiation of ProSe UE-to-Network Relay operation before losing the RRC Connection. As for the preparation, UE may need to inform the eNB of availability and/or association of the ProSe UE-to-Network Relay entity. The eNB may establish DRB towards the ProSe UE-to-Network Relay before the in-coverage UE leaves the network coverage. It is for further study whether the no longer necessary DRB towards the Remote UE at the present should be released by RRC or by NAS.

Scenario 3: ProSe UE-to-Network Relay Coverage→ProSe UE-to-Network Relay Coverage In this scenario, the make-before-break mechanism is necessary if service continuity should be supported. Therefore the Remote UE may need to prepare the initiation of ProSe UE-to-Network Relay operation with other Relay entity before leaving the coverage of current ProSe UE-to-Network coverage, i.e. the Remote UE may need to associate with other UE-to-Network Relay entity before current Relay entity's signal is too weak.

Proposal 9: If service continuity is necessary to support, it should discuss above scenarios in more detail.

(A4) Remote UE Terminated Service

Considering applicability to voice, video, the ProSe UE-to-Network Relay should support Remote UE terminated data (a.k.a., MT (Mobile Terminated) data) as well as Remote UE originated data (MO (Mobile Originated) data). So, it should be considered how to page the Remote UE which is in ProSe UE-to-Network Relay's coverage but already out of network coverage. Considering the mobility scenario between coverage of ProSe UE-to-Network Relays and/or no RRC connection between the Remote UE and the ProSe UE-to-Network Relay/NW (i.e., no TAU (Tracking Area Update) can be assumed due to no NAS PDU (Protocol Data Unit) transfer), the eNB or CN (Core Network) may need to handle the Remote UEs with additional mechanism.

Proposal 10: It should determine whether or not eNB and/or Core Network need to know the existence of each Remote UE after determining the design of the Remote UE terminated service.

The invention claimed is:
1. A radio terminal, comprising:
a controller including at least one processor and at least one memory coupled to the at least one processor, the at least one processor configured to execute processes of:
establishing connection with a network for relaying using a Device to Device (D2D) proximity service;
transmitting a discovery message for the relaying, after the connection is established;

receiving a request message from another radio terminal that has received the discovery message, wherein the request message includes an identifier of the another radio terminal;

transmitting the identifier of the another radio terminal, to a network apparatus included in an Evolved Packet Core (EPC), as an identifier of a remote node to which data is relayed by the relaying;

determining whether the another radio terminal is in vicinity of the radio terminal, based on reception of a predetermined message from the another radio terminal, the predetermined message being periodically transmitted from the another radio terminal based on a first timer, wherein the determining whether the another radio terminal is in vicinity of the radio terminal comprises:
 starting or restarting a second timer upon receiving the predetermined message, a value of the second timer being determined based on a value of the first timer; and
 determining that the another radio terminal is not in vicinity of the radio terminal upon expiration of the second timer; and transmitting a message indicating that the another radio terminal is not in vicinity of the radio terminal to the network apparatus, upon the expiration of the second timer.

2. A control method, comprising:

establishing, by a first radio terminal, connection with a network for relaying using a Device to Device (D2D) proximity service;

transmitting, by the first radio terminal, a discovery message for the relaying, after the connection is established;

receiving, by the first radio terminal, a request message from a second radio terminal that has received the discovery message, wherein the request message includes an identifier of the second radio terminal;

transmitting, by the first radio terminal, the identifier of the second radio terminal, to a network apparatus included in an Evolved Packet Core (EPC), as an identifier of a remote node to which data is relayed by the relaying;

determining, by the first radio terminal, whether the second radio terminal is in vicinity of the first radio terminal, based on reception of a predetermined message from the second radio terminal, the predetermined message being periodically transmitted from the second radio terminal based on a first timer, wherein the determining whether the second radio terminal is in vicinity of the first radio terminal comprises:
 starting or restarting, by the first radio terminal, a second timer upon receiving the predetermined message, a value of the second timer being determined based on a value of the first timer; and
 determining, by the first radio terminal, that the second radio terminal is not in vicinity of the first radio terminal upon expiration of the second timer; and transmitting, by the first radio terminal, a message indicating that the second radio terminal is not in vicinity of the first radio terminal to the network apparatus, upon the expiration of the second timer.

\* \* \* \* \*